US012459789B2

(12) United States Patent
Sikora et al.

(10) Patent No.: US 12,459,789 B2
(45) Date of Patent: Nov. 4, 2025

(54) COUPLING FOR SUSPENDED LOAD CONTROL APPARATUS, SYSTEM, AND METHOD

(71) Applicant: Vita Inclinata IP Holdings LLC, Broomfield, CO (US)

(72) Inventors: Derek Sikora, Denver, CO (US); Logan Goodrich, Golden, CO (US)

(73) Assignee: Vita Inclinata IP Holdings LLC, Denver, CO (US)

( * ) Notice: Subject to any disclaimer, the term of this patent is extended or adjusted under 35 U.S.C. 154(b) by 658 days.

(21) Appl. No.: 17/748,985

(22) Filed: May 19, 2022

(65) Prior Publication Data

US 2022/0274809 A1      Sep. 1, 2022

Related U.S. Application Data

(63) Continuation of application No. 17/431,019, filed on Aug. 13, 2021, now Pat. No. 11,339,034, and a
(Continued)

(51) Int. Cl.
*B66C 13/10*       (2006.01)
*B64D 1/22*        (2006.01)
(Continued)

(52) U.S. Cl.
CPC .......... *B66C 13/105* (2013.01); *B66C 13/085* (2013.01); *B66C 13/46* (2013.01); *B64D 1/22* (2013.01)

(58) Field of Classification Search
CPC ....... B66C 13/06; B66C 13/063; B66C 13/08; B66C 13/085; B66C 13/10; B66C 13/105;
(Continued)

(56) References Cited

U.S. PATENT DOCUMENTS

| 1,935,283 A | 11/1933 | Adams |
| 2,264,936 A | 12/1941 | Dorsa |

(Continued)

FOREIGN PATENT DOCUMENTS

| DE | 2356504 A | * 5/1975 | ............. B66C 13/06 |
| DE | 19623562 A1 | * 12/1997 | ............... B64D 1/22 |

(Continued)

OTHER PUBLICATIONS

All pages, Written Opinion dated Apr. 30, 2020 for PCT Application No. PCT/US2020/017790, filed Feb. 11, 2020.
(Continued)

*Primary Examiner* — Anna M Momper
*Assistant Examiner* — Henrix Soto
(74) *Attorney, Agent, or Firm* — Martin Spencer Garthwaite

(57) ABSTRACT

Disclosed are systems, apparatuses, and methods for a suspended load control system which controls tension on a winch control line in order to decrease latency between movement or rotation of the load control system and the load and reduce a reaction time between movement or rotation of the load control system and the load.

20 Claims, 17 Drawing Sheets

Related U.S. Application Data continuation of application No. PCT/US2020/062414, filed on Nov. 25, 2020.

(60) Provisional application No. 62/940,155, filed on Nov. 25, 2019.

(51) Int. Cl.
   *B66C 13/08* (2006.01)
   *B66C 13/46* (2006.01)

(58) Field of Classification Search
   CPC .. B66C 13/04; B66C 1/12; B66C 1/10; B66D 3/18; B64D 1/08; B64D 1/22
   USPC ........................................................ 212/285
   See application file for complete search history.

(56) References Cited

U.S. PATENT DOCUMENTS

| | | | |
|---|---|---|---|
| 2,428,656 A | 10/1947 | Elliott et al. | |
| 2,651,533 A | 9/1953 | Cecil | |
| 2,675,131 A * | 4/1954 | Osojnak | B66C 13/00 |
| | | | 212/331 |
| 2,717,656 A | 9/1955 | Bannister | |
| 3,036,797 A | 5/1962 | Domenico | |
| 3,044,818 A | 7/1962 | Harry | |
| 3,210,114 A * | 10/1965 | Lawton | B66C 13/08 |
| | | | 414/754 |
| 3,210,115 A | 10/1965 | Irving et al. | |
| 3,265,336 A | 8/1966 | Peterson | |
| 3,498,476 A | 3/1970 | Mattson et al. | |
| 3,554,468 A | 1/1971 | Mcvicar | |
| 3,598,440 A | 8/1971 | Ramsden et al. | |
| 3,601,342 A | 8/1971 | Piasecki | |
| 3,602,544 A | 8/1971 | Marsh | |
| 3,656,796 A | 4/1972 | Cook | |
| 3,663,051 A * | 5/1972 | Yu | B66D 3/18 |
| | | | 294/82.12 |
| 3,690,602 A | 9/1972 | Marsh | |
| 3,724,817 A | 4/1973 | Simons | |
| 3,779,395 A * | 12/1973 | Dykeman | B66C 13/00 |
| | | | 212/88 |
| 3,799,358 A * | 3/1974 | Putnam | B66C 13/08 |
| | | | 294/81.4 |
| 3,801,070 A * | 4/1974 | Piasecki | B66C 13/08 |
| | | | 254/312 |
| 3,829,052 A | 8/1974 | Flannelly | |
| 3,833,189 A | 9/1974 | Fowler et al. | |
| 3,838,836 A | 10/1974 | Asseo et al. | |
| 3,904,156 A | 9/1975 | Smith | |
| 3,946,971 A | 3/1976 | Chadwick | |
| 4,124,181 A | 11/1978 | Kolwey | |
| 4,138,078 A | 2/1979 | Hester et al. | |
| 4,267,987 A | 5/1981 | McDonnell | |
| 4,364,704 A | 12/1982 | Dreesen et al. | |
| 4,378,919 A | 4/1983 | Smith | |
| 4,553,719 A | 11/1985 | Ott | |
| 4,601,444 A | 7/1986 | Lindenbaum | |
| 4,695,012 A | 9/1987 | Lindenbaum | |
| 4,747,745 A | 5/1988 | Pippen et al. | |
| 4,826,109 A | 5/1989 | Camus | |
| 4,881,601 A | 11/1989 | Smith | |
| 4,883,184 A | 11/1989 | Albus | |
| 4,889,297 A | 12/1989 | Ikeda | |
| 4,984,757 A | 1/1991 | Hartung et al. | |
| 5,071,184 A | 12/1991 | Dessaux | |
| 5,071,573 A | 12/1991 | Coffindaffer et al. | |
| 5,125,707 A | 6/1992 | Chaen et al. | |
| 5,131,491 A | 7/1992 | Varner et al. | |
| 5,143,326 A | 9/1992 | Parks | |
| 5,190,250 A | 3/1993 | DeLong et al. | |
| 5,249,652 A | 10/1993 | Leitzman et al. | |
| 5,273,333 A | 12/1993 | Hatfield et al. | |
| 5,299,845 A | 4/1994 | Gabriel | |
| 5,344,203 A | 9/1994 | Tollenaere | |
| 5,352,056 A | 10/1994 | Chandler | |
| 5,358,219 A | 10/1994 | Shenk et al. | |
| 5,396,815 A | 3/1995 | Polites et al. | |
| 5,443,566 A | 8/1995 | Rushmer et al. | |
| 5,451,032 A | 9/1995 | Rhoads | |
| 5,465,925 A | 11/1995 | Connolly et al. | |
| 5,499,785 A | 3/1996 | Roberts et al. | |
| 5,518,205 A | 5/1996 | Wurst et al. | |
| 5,524,870 A | 6/1996 | Tallent et al. | |
| 5,562,394 A | 10/1996 | Brown, Jr. | |
| 5,593,113 A | 1/1997 | Cox | |
| 5,613,722 A | 3/1997 | Fandrich et al. | |
| 5,816,098 A | 10/1998 | Kanki et al. | |
| 5,816,636 A | 10/1998 | Gibson et al. | |
| 5,871,249 A | 2/1999 | Williams | |
| 5,898,746 A | 4/1999 | Baversten et al. | |
| 5,927,438 A | 7/1999 | Ostrobrod | |
| 5,961,563 A | 10/1999 | Overton | |
| 6,189,834 B1 | 2/2001 | Dietz et al. | |
| 6,199,793 B1 | 3/2001 | Hainsworth et al. | |
| 6,439,407 B1 | 8/2002 | Jacoff et al. | |
| 6,505,574 B1 * | 1/2003 | Naud | B66D 1/525 |
| | | | 414/139.6 |
| 6,533,220 B2 | 3/2003 | Schuster | |
| D473,482 S | 4/2003 | Felmingham | |
| 6,578,796 B2 | 6/2003 | Maeda | |
| 6,708,926 B2 | 3/2004 | Bonisch | |
| 6,814,185 B1 | 11/2004 | Ostrobrod | |
| 6,983,833 B2 | 1/2006 | Ivers et al. | |
| 7,028,351 B1 | 4/2006 | Frieder et al. | |
| 7,131,515 B2 | 11/2006 | Gartsbeyn et al. | |
| 7,267,240 B2 | 9/2007 | Maurer et al. | |
| 7,720,582 B2 | 5/2010 | Makinadjian | |
| D617,293 S | 6/2010 | Yoshihashi | |
| 7,887,011 B1 | 2/2011 | Baldwin | |
| 7,948,237 B2 | 5/2011 | Kuzmin et al. | |
| 8,131,384 B2 | 3/2012 | Karpman et al. | |
| 8,157,205 B2 | 4/2012 | McWhirk | |
| 8,226,042 B1 | 7/2012 | Howell et al. | |
| 8,231,083 B2 | 7/2012 | Kutzmann et al. | |
| 8,292,229 B2 | 10/2012 | Pancotti et al. | |
| D671,293 S | 11/2012 | Fredriksson | |
| 8,413,923 B2 | 4/2013 | Brenner et al. | |
| 8,496,279 B2 | 7/2013 | Aoki | |
| 8,534,607 B2 | 9/2013 | Tardiff et al. | |
| 8,534,608 B1 | 9/2013 | Cox, IV | |
| 8,591,161 B1 | 11/2013 | Bernhardt | |
| 8,840,355 B1 | 9/2014 | Kulesha | |
| 8,886,402 B1 | 11/2014 | Lou | |
| 8,888,048 B2 | 11/2014 | Figoureux et al. | |
| 8,894,050 B2 | 11/2014 | Wootten et al. | |
| 8,899,903 B1 | 12/2014 | Saad et al. | |
| 8,903,568 B1 | 12/2014 | Wang et al. | |
| 8,925,901 B2 | 1/2015 | Gaillard | |
| 8,938,325 B1 | 1/2015 | McGinnis et al. | |
| 8,967,533 B2 | 3/2015 | DeVaul et al. | |
| 9,027,976 B1 | 5/2015 | Tollenaere | |
| 9,096,294 B1 | 8/2015 | Dong et al. | |
| 9,114,871 B2 | 8/2015 | Woodworth et al. | |
| 9,194,977 B1 | 11/2015 | Dungan et al. | |
| 9,205,922 B1 | 12/2015 | Bouwer | |
| 9,223,008 B1 | 12/2015 | Hartman et al. | |
| 9,242,741 B1 | 1/2016 | Cockell | |
| 9,302,770 B2 | 4/2016 | Burgess et al. | |
| 9,375,841 B1 | 6/2016 | Kemper | |
| 9,422,139 B1 | 8/2016 | Bialkowski et al. | |
| 9,676,481 B1 | 6/2017 | Buchmueller | |
| 9,688,404 B1 | 6/2017 | Buchmueller et al. | |
| 9,797,723 B1 | 10/2017 | Huang | |
| 9,800,091 B2 | 10/2017 | Nugent, Jr. et al. | |
| 9,836,063 B1 | 12/2017 | Bonawitz et al. | |
| 9,840,401 B2 * | 12/2017 | Hansen | B66C 23/185 |
| 9,849,981 B1 | 12/2017 | Burgess et al. | |
| 9,850,113 B2 | 12/2017 | Melin et al. | |
| 9,881,506 B1 | 1/2018 | Gentry | |
| 9,908,756 B2 | 3/2018 | Heravi et al. | |
| 9,958,876 B2 | 5/2018 | Lind et al. | |
| 10,023,312 B2 | 7/2018 | Repp et al. | |

(56) References Cited

U.S. PATENT DOCUMENTS

| | | |
|---|---|---|
| 10,023,313 B2 | 7/2018 | Behrens et al. |
| 10,071,804 B1 | 9/2018 | Buchmueller et al. |
| 10,112,805 B1 | 10/2018 | Joralmon |
| 10,286,943 B1 | 5/2019 | Greenblatt et al. |
| 10,288,075 B2 | 5/2019 | Ishiba |
| 10,451,504 B2 | 10/2019 | Campbell et al. |
| 10,479,503 B2 | 11/2019 | Sikora et al. |
| 10,519,013 B2 | 12/2019 | Curran et al. |
| 10,538,417 B1 | 1/2020 | Raman et al. |
| 10,676,190 B2 | 6/2020 | Mitchell et al. |
| 10,870,558 B2 | 12/2020 | Sikora et al. |
| 10,899,586 B2 | 1/2021 | Cranney, III |
| 10,918,892 B2 | 2/2021 | Dickson |
| 10,940,061 B2 | 3/2021 | Sikora et al. |
| 10,960,976 B2 † | 3/2021 | Bosma |
| 11,008,198 B2 | 5/2021 | Sikora et al. |
| 11,142,316 B2 | 10/2021 | Sikora et al. |
| 11,142,433 B2 | 10/2021 | Sikora et al. |
| 11,209,836 B1 | 12/2021 | Sikora et al. |
| 11,339,034 B2 | 5/2022 | Sikora et al. |
| 11,370,642 B2 | 6/2022 | Markwell |
| 11,535,496 B2 | 12/2022 | Al-Husseini et al. |
| 2002/0113448 A1 | 8/2002 | Kazerooni et al. |
| 2003/0085319 A1 | 5/2003 | Wagner et al. |
| 2003/0121024 A1 | 6/2003 | Hill et al. |
| 2003/0220177 A1 | 11/2003 | Orlando |
| 2004/0026349 A1 | 2/2004 | Colgate et al. |
| 2004/0032140 A1 | 2/2004 | Solstad |
| 2004/0149056 A1* | 8/2004 | Lukas .................. B66C 13/063 702/113 |
| 2005/0072965 A1 | 4/2005 | Sanders et al. |
| 2005/0242237 A1 | 11/2005 | Scott |
| 2006/0163892 A1 | 7/2006 | Nguyen et al. |
| 2007/0200032 A1 | 8/2007 | Eadie et al. |
| 2008/0027586 A1 | 1/2008 | Baek et al. |
| 2008/0272566 A1 | 11/2008 | Thompson |
| 2009/0004004 A1 | 1/2009 | Vincenzi |
| 2009/0152391 A1 | 6/2009 | McWhirk |
| 2009/0200428 A1 | 8/2009 | Smith et al. |
| 2010/0000349 A1 | 1/2010 | Stevens et al. |
| 2010/0012771 A1 | 1/2010 | Jess |
| 2010/0176618 A1 | 7/2010 | Souke et al. |
| 2010/0237183 A1 | 9/2010 | Wilson et al. |
| 2010/0291707 A1 | 11/2010 | Mirkin et al. |
| 2010/0319910 A1 | 12/2010 | Ives et al. |
| 2011/0168514 A1 | 7/2011 | Lee |
| 2011/0192932 A1 | 8/2011 | Brenner et al. |
| 2011/0221215 A1* | 9/2011 | Botwright ............... B66C 13/08 294/81.4 |
| 2012/0006779 A1 | 1/2012 | Mills et al. |
| 2012/0145832 A1 | 6/2012 | Schuster |
| 2012/0150364 A1 | 6/2012 | Tillotson et al. |
| 2012/0271582 A1 | 10/2012 | Bageshwar et al. |
| 2012/0292434 A1 | 11/2012 | Welsh |
| 2012/0293177 A1 | 11/2012 | Dodds |
| 2013/0054054 A1 | 2/2013 | Tollenaere et al. |
| 2013/0056586 A1 | 3/2013 | Occhiato et al. |
| 2013/0081245 A1 | 4/2013 | Vavrina et al. |
| 2013/0270393 A1 | 10/2013 | Shrapnel |
| 2013/0299634 A1 | 11/2013 | Haggard |
| 2014/0154965 A1 | 6/2014 | Han et al. |
| 2014/0224755 A1 | 8/2014 | Eriksson et al. |
| 2014/0252170 A1 | 9/2014 | Prud'Homme-Lacroix |
| 2014/0333232 A1 | 11/2014 | Verheyen |
| 2015/0041598 A1 | 2/2015 | Nugent et al. |
| 2015/0151837 A1 | 6/2015 | Sane et al. |
| 2015/0360779 A1 | 12/2015 | Behrens et al. |
| 2016/0009393 A1 | 1/2016 | Repp et al. |
| 2016/0009531 A1 | 1/2016 | Saliba et al. |
| 2016/0031683 A1 | 2/2016 | Fenker et al. |
| 2016/0048131 A1 | 2/2016 | Lesperance et al. |
| 2016/0200553 A1* | 7/2016 | Sørensen ............... B66C 23/185 212/273 |
| 2016/0236779 A1 | 8/2016 | Thomas et al. |
| 2016/0240417 A1 | 8/2016 | Tomida |
| 2016/0297650 A1 | 10/2016 | Bang |
| 2016/0298962 A1 | 10/2016 | Lee |
| 2016/0332728 A1 | 11/2016 | Winfree et al. |
| 2016/0340030 A1 | 11/2016 | Roussey et al. |
| 2016/0340035 A1 | 11/2016 | Duru |
| 2016/0340039 A1 | 11/2016 | Waltner et al. |
| 2017/0009859 A1 | 1/2017 | Sevagen |
| 2017/0052676 A1 | 2/2017 | Pulier et al. |
| 2017/0073055 A1 | 3/2017 | Song |
| 2017/0088261 A1 | 3/2017 | Sequeira et al. |
| 2017/0129749 A1 | 5/2017 | Mijangos et al. |
| 2017/0138737 A1 | 5/2017 | Cordova et al. |
| 2017/0197718 A1 | 7/2017 | Buchmueller |
| 2017/0217566 A1 | 8/2017 | Ichinose |
| 2017/0276139 A1 | 9/2017 | Ishiba |
| 2017/0284795 A1 | 10/2017 | Carlson et al. |
| 2017/0291707 A1 | 10/2017 | Veronesi et al. |
| 2018/0057318 A1 | 3/2018 | Benton et al. |
| 2018/0072404 A1 | 3/2018 | Prager et al. |
| 2018/0099748 A1 | 4/2018 | Lesperance et al. |
| 2018/0208309 A1 | 7/2018 | Wang |
| 2018/0229855 A1 | 8/2018 | Sane et al. |
| 2018/0251346 A1 | 9/2018 | Thomson et al. |
| 2018/0252616 A1 | 9/2018 | Bryson et al. |
| 2018/0282130 A1 | 10/2018 | Kale et al. |
| 2018/0339891 A1 | 11/2018 | Ijadi-Maghsoodi et al. |
| 2019/0016480 A1 | 1/2019 | Kashiwa et al. |
| 2019/0031474 A1 | 1/2019 | Stilborn et al. |
| 2019/0033892 A1 | 1/2019 | Gomez et al. |
| 2019/0055111 A1 | 2/2019 | Cranney, III |
| 2019/0193827 A1 | 6/2019 | Zerweckh |
| 2019/0236370 A1 | 8/2019 | Man |
| 2019/0241267 A1 | 8/2019 | Sikora et al. |
| 2019/0337776 A1 | 11/2019 | Fanello et al. |
| 2020/0087121 A1 | 3/2020 | Ohayon et al. |
| 2020/0165010 A1 | 5/2020 | Sun et al. |
| 2020/0180763 A1 | 6/2020 | Schütz et al. |
| 2020/0182252 A1 | 6/2020 | Nakasuji et al. |
| 2020/0210704 A1 | 7/2020 | Han et al. |
| 2020/0222257 A1 | 7/2020 | Sikora et al. |
| 2020/0231415 A1 | 7/2020 | Sikora et al. |
| 2020/0271270 A1 | 8/2020 | Sikora et al. |
| 2020/0369492 A1 | 11/2020 | Sikora et al. |
| 2020/0400330 A1 | 12/2020 | Przybylski et al. |
| 2021/0371250 A1 | 12/2021 | Bedgood et al. |
| 2021/0371252 A1 | 12/2021 | Sikora et al. |
| 2022/0121225 A1 | 4/2022 | Sikora et al. |
| 2022/0135378 A1 | 5/2022 | Sikora et al. |
| 2022/0274696 A1 | 9/2022 | Sikora et al. |
| 2022/0274809 A1 | 9/2022 | Sikora et al. |
| 2022/0277472 A1 | 9/2022 | Birchfield et al. |
| 2022/0281721 A1 | 9/2022 | Sikora et al. |
| 2022/0371736 A1 | 11/2022 | Sikora et al. |
| 2023/0117935 A1 | 4/2023 | Al-Husseini et al. |

FOREIGN PATENT DOCUMENTS

| | | | |
|---|---|---|---|
| EP | 0606108 A1 | 7/1994 | |
| EP | 1334945 A2 * | 8/2003 | ........... B66C 13/085 |
| GB | 2327657 A | 2/1999 | |
| GB | 2457149 A | 8/2009 | |
| GB | 2513646 A | 11/2014 | |
| JP | H04256686 A | 9/1992 | |
| JP | H0543184 A | 2/1993 | |
| JP | H05193584 A | 8/1993 | |
| JP | H07179288 A | 7/1995 | |
| JP | 08312588 A | 11/1996 | |
| JP | H09317795 A | 12/1997 | |
| JP | 10032961 | 2/1998 | |
| JP | H10305989 A | 11/1998 | |
| JP | H1111859 A | 1/1999 | |
| JP | 11037093 A | 2/1999 | |
| JP | 2016210607 A | 12/2016 | |
| JP | 2017500257 A | 1/2017 | |
| JP | 2018140860 A | 9/2018 | |
| JP | 2019023143 A | 2/2019 | |
| JP | 6554258 B1 | 7/2019 | |
| NL | 7807287 A * | 1/1980 | ............ B66C 1/101 |
| NO | 20171181 A1 | 1/2019 | |

(56) References Cited

FOREIGN PATENT DOCUMENTS

| WO | 2011012915 A1 | 2/2011 | |
|---|---|---|---|
| WO | 2014076189 A1 | 5/2014 | |
| WO | 2018234670 A1 | 12/2018 | |
| WO | WO-2019114898 A1 * | 6/2019 | ............. B66C 1/101 |

OTHER PUBLICATIONS

Extended European Search Report and Search Opinion, Application No. EP 19 751 097.7, mailed Aug. 31, 2021, 15 pages.
Internal Search Report mailed Apr. 30, 2020 for PCT/US2020/017790, filed Feb. 11, 2020.
International Search Report dated Apr. 3, 2019, for PCT/US19/13603 filed Jan. 15, 2019.
International Search Report in PCT/US2020/062414, mailed Feb. 19, 2021, entire document.
International Search Report mailed May 27, 2020 for PCT.US20/19967 filed Feb. 26, 2020.
International Search Report mailed Oct. 6, 2020, for PCT/US2020/042936, filed Jul. 2020.
Phillip J. Mckerrow, The design of a tethered aerial robot, Faculty of Informatics—Papers (Archive) Faculty of Engineering and InformationSciences University of Wollongong, Oct. 4, 2007, pp. 1-8, University of Wollongong, Australia, https://ro.uow.edu.au/infopapers/519.
Written Opinion in PCT/US2020/062414, mailed Feb. 19, 2021, entire document.
Written Opinion mailed Apr. 3, 2019, for PCT/US19/13603, filed Jan. 15, 2019.
Written Opinion mailed May 27, 2020, for PCT/US20/19967, filed Feb. 26, 2020.
Written Opinion mailed Oct. 6, 2020 for PCT/US2020/042936 filed Jul. 21, 2020.
Young, L.A ,"Enhanced Rescue Lift Capability", 63rd Annual Forum of the AHS international, Virginia Beach, VA, May 1-3, 2007 (May 2007). Fig.2,5,12,16, Abstract pp. 6-12.

\* cited by examiner
† cited by third party

COUPLING FOR SUSPENDED LOAD CONTROL APPARATUS, SYSTEM, AND METHOD

CROSS-REFERENCE TO RELATED APPLICATIONS

This application is a continuation of U.S. patent application Ser. No. 17/431,019, filed Aug. 13, 2021, and titled "COUPLING FOR SUSPENDED LOAD CONTROL APPARATUS, SYSTEM, AND METHOD"; Ser. No. 17/431,019 is a non-provisional of and claims the benefit of and incorporates by reference U.S. provisional patent application 62/940,155, filed Nov. 25, 2019, and titled, "SUSPENDED LOAD CONTROL CRANE HOOK APPARATUS, SYSTEM, AND METHOD"; this application is a continuation of International patent application PCT/US2020/062414, filed Nov. 25, 2020, and titled "COUPLING FOR SUSPENDED LOAD CONTROL APPARATUS, SYSTEM, AND METHOD"; PCT/US2020/062414 is a non-provisional of and claims the benefit of and incorporates by reference U.S. provisional patent application 62/940,155, filed Nov. 25, 2019, and titled, "SUSPENDED LOAD CONTROL CRANE HOOK APPARATUS, SYSTEM, AND METHOD"; the subject matter of the foregoing applications is hereby incorporated into the present application and the priority of foregoing application is hereby claimed in the present application.

FIELD

This disclosure is directed to improved apparatus(es), system(s), and method(s) for and related to control of loads suspended on a suspension cable by a hook below a carrier.

BACKGROUND

People and/or equipment ("loads") may be transported to or from a location as a load suspended by a cable from a helicopter, crane, airplane, or other carrier using a hoist system. Cranes, helicopters, and aircraft (including fixed-wing aircraft) may be referred to collectively herein as "carriers". Carriers with a connection to the ground or to another platform (such as a platform floating on water), such as cranes, may be referred to herein as "platform-based carriers". Carriers other than platform-based carriers, such as helicopters and aircraft (fixed wing or otherwise), may be referred to herein as "flying carriers".

A hook or similar structure may be found on the bottom of a suspension cable; the load may be secured to the hook. The hook may transfer a lifting force between the carrier and the load. The hook may comprise or be part of an assembly which includes a block; the block may withstanding impact and protecting the hook from contact with the environment.

During operations in which a load is transported by a carrier, the load may be subject to winds, interaction with the suspension cable, and other external and internal factors that may cause the load to move in an unstable, undesirable, or hazardous manner. To address such conditions, and to otherwise control a suspended load, operators of carriers may want to use equipment that provides control of a suspended load, including equipment that provides suspended load control remote from the carrier, e.g. at or near a load, such as using remotely powered fans. Other systems have been developed to provide suspended load control below platform-based carriers by changing the orientation of a spinning gyroscope or flywheel, though these systems may have a different type of control system, may be able to output torque but not horizontal thrust, and may not be suitable for use below a flying carrier due to weight.

In hoist and sling operations, it may be desirable for the load to hang directly off of a hook, rather than off of equipment to provide control of a suspended load. This may be because the hook is very sturdy, has very few parts, and single-purpose. For example, and as noted, the hook may transfer a lifting force between the carrier and the load; the lifting force may be very large. In contrast, equipment to provide control of a suspended load may include many parts, e.g. fans, etc., and may be more subject to damage and failure. Operators of carriers may be reluctant or unable to suspend a load directly from equipment to provide control of a suspended load, but may prefer or may need to continue to suspend the load from a hook and or block.

In addition, in hoist and sling operations, the suspension cable is often a braided steel cable, or the like. Suspension cables, whether braided or not, should not be subject to torque, as this may cause the cable to wind up, unwind, kink, weaken, break, not wind properly onto a winch, or the like.

In hoist and sling operations, observed motion of suspended loads includes the following components: vertical translation (motion up and down) along the Y axis (referred to herein as "vertical translation"); horizontal translation along either or both the X and Z axis; and rotation or "yaw" about the Y axis. Horizontal translation can manifest as lateral motion or, when in both the X and Z axis, as conical pendulum motion of the load, with the pivot point of the pendulum being where the cable is secured to the carrier ("pendular motion"); pendular motion generally also includes a component of vertical translation. Roll (rotation about the X axis) and pitch (rotation about the Y axis) may also occur, though if a load is suspended by a cable and is not buoyant, the dominant motions are vertical translation, horizontal translation, pendular motion, and yaw. Vertical and horizontal translation may be caused by movement of the suspension cable, such as by movement of the carrier, movement of the load, differences in momentum between the load and the carrier, by wind—including propeller wash—impacts, by letting out or retracting cable from or to a hoist, and by external forces. Axis, when discussed herein, are relative to a normal axis of a suspended load, a normal axis of a carrier, or a normal axis of a gravitational field.

Yaw, lateral motion, and pendular motion complicate lift operations, cause delays, and can lead to death of aircrew, crane operators, and of people on the ground. Yaw and lateral and pendular motion can also interfere with bringing a load into or delivering a load to a location. For example, ground crew may not be able to approach a load if it is undergoing pendular motion or yaw or a platform-based carrier operator may not be able to completely lower a load to a desired destination if the load is undergoing pendular motion or yaw. For example, delivery of a load to a deck of a ship or to a worksite may be significantly complicated by pendular motion or yaw of the load, even if the deck or worksite is stable and is not also subject to heave, roll, or pitch, as it may be.

One or more components of undesired motion of the load may accelerate or grow more pronounced as a load is drawn up to the carrier and the suspension cable shortens. Horizontal and pendular motion of a load can also interact with the carrier to produce dangerous reactive or sympathetic motion in the carrier.

Therefore, there is a need for equipment to provide control of a suspended load, such as to provide torque or a horizontal force to control yaw, lateral motion, and pendular motion, wherein the equipment to provide control of the suspended load can work in conjunction with a hook and or block.

DETAILED DESCRIPTION

Figure 1:
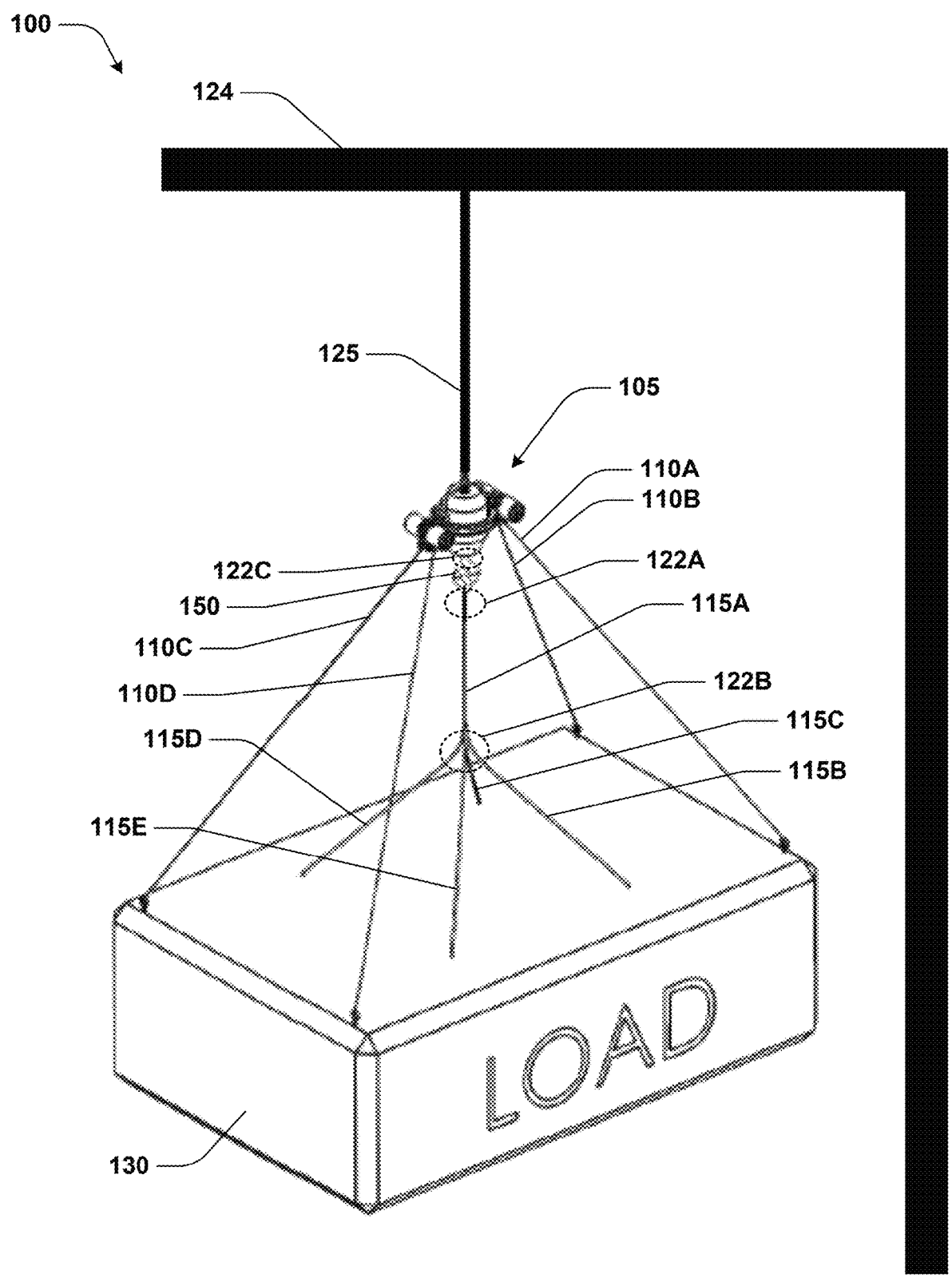
FIG. 1 is a view of a carrier, carrier hook, and suspended load control system ("SLCS"), in accordance with an embodiment.

Reference is now made in detail to the description of the embodiments illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein. For example, the embodiments set forth below are primarily described in the context of a helicopter sling load, search and rescue operations, and/or crane operations. However, these embodiments are illustrative examples and in no way limit the disclosed technology to any particular application or platform.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise. As used in this specification and the appended claims, the singular forms "a," "an," and "the" include plural referents unless the content clearly dictates otherwise. It should also be noted that the term "or" is generally employed in its sense including "and/or" unless the content clearly dictates otherwise. When an element in a figure is labeled with a number which includes a letter, instances of the element are generally similar and a group of such elements may be referred to together or collectively, without the letter.

Platform-based carrier operators may move loads at slow rates to minimize pendular motion or may use dedicated control cables (whether on the ground, neighboring structures, or to or from the carrier). However, these measures increase costs, complexity, and risk of failure of a suspended load operation. These measures are inadequate and highly problematic.

In various embodiments, as described further herein, a suspended load control system addresses control of a load, independent from a carrier. The suspended load control system or suspended load stability system (referred to together as, "SLCS") of this disclosure controls a load by exerting or outputting force or force vectors from thrusters, fans, propellers, flywheels, gyroscopes, or the like at, or near, a location of the load. Thrusters, fans, propellers and electric ducted fans may be referred to herein as "EDFs" or "fans". Vector thrust force produced by the fans and or winches may be used to counteract yaw and pendular motion. Vector thrust force produced by the fans may be used to translate a load horizontally, such as to avoid an obstacle or to move a load into an offset position relative to a normal lowest-energy hanging position. Vector thrust force produced by the fans and or winches may be used to control the fine location and rotation of a load, independently from the carrier. Vector thrust force produced by the fans may be used to increase the speed of operation of a carrier while maintaining safe operating parameters.

The SLCS of this disclosure further may be mounted on a hook and or block. The SLCS may be mounted on the hook and or block via a rotational coupling, wherein the rotational coupling comprises one or more bearings. The rotational coupling may allow the SLCS to rotate without imparting significant torque on the main load bearing line.

The SLCS of this disclosure may further comprise one or more winches; the winches may be secured to the load with one or more winch control lines. A control module of the SLCS may control the winch to maintain tension on the winch control lines; the control module may further control thrusters of the SLCS to control the load.

Consequently, an SLCS as disclosed herein works with or in conjunction with existing hooks and or blocks, enhances safety, improves performance of carrier and load operations, and may allow carrier operators to increase work output and to reduce damage to loads and surrounding objects, as the SLCS dynamically controls fine location and rotation of a load. An SLCS can provide benefits to, for example, platform-based carrier operations and to flying carrier operations.

Once deployed and in-use, the SLCS is agnostic with respect to the platform from which the load is suspended (e.g., the characteristics of a crane or helicopter "ownship", etc.), as it independently determines its state, tensions a control line between a winch and the load, and or as it independently applies thrust to stabilize the load or to direct the load in a desired direction, without imparting significant torque on the main load bearing line. This permits widespread adoption of the system regardless of carrier type, lowering cost and mitigating solution risks.

FIG. 1 illustrates an embodiment of a suspended load control carrier hook system and load 100 in which platform-based carrier 124 supports and or relocates load 130 via main load bearing line 125 and load bearing connector lines 115A through 115E. Platform-based carrier 124 is illustrated as an example, a flying carrier may also or alternatively be used.

With reference to FIG. 1 through FIG. 4, carrier 124 may support load 130 by way of a winch, hoist or the like in carrier 124, a suspension cable (also referred to herein as a "main load bearing line 125"), a head block 145, which is secured to the main load bearing line 125, a head block hook 150, and one or more load bearing connector lines 115, which secure load 130 to head block hook 150. In the example illustrated in FIG. 1, load bearing connector line 115A may branch into a plurality of connector lines 115B through 115E (referred to together with connector line 115 as connector line or lines 115). Connector lines 115 may be secured to head block hook 150 (see FIG. 2) via one or more load bearing rotational coupling(s) 122A, 122B, or 122C which allow load 130 to rotate, spin, or undergo yaw without winding up or unwinding main load bearing line 125. Load bearing rotational coupling 122 may comprise, for example, thrust bearings or another bearing set or bearing system. In the embodiment illustrated in FIG. 1, SLCS 105 includes four control lines 110A through 110D (referred to collectively as control lines 110). A different number of control lines could be used, such as one, two, three, or more than four. Main load bearing line 125 is often a cable, including a braided cable. Rotation of main load bearing line 125 around the Y axis may not be desirable. For example, a braided cable may unwind or may develop over-winding kinks if is rotated, either of which can result in problems that range from delays in work, to damage, to catastrophic failure of equipment, including of the main load bearing line, hoist, or the like. To address this issue, load bearing rotational coupling 122A, 122B, and or 122C may be located between the load 130 and at least one of hook 150 and or head block 145; however, the load bearing rotational coupling may also allow load 130 to rotate in an uncontrolled manner, which, as noted, may be undesirable.

SLCS 105 may be secured to head block 145, which may allow SLCS 105 to be used with respect to a wide range of existing crane equipment. However, if SLCS 105 is imparting force on load 130, per the remarks above, SLCS 105 should not also impart rotational force or torque on the main load bearing line. To address this, SLCS 105 is secured to head block 145 at, by, or in conjunction with control system rotational coupling 120 (please see FIG. 2). Control system rotational coupling 120 may be, for example, a thrust bearing set, a tapered roller thrust bearing set, a spherical roller thrust bearing set, or the like. Control system rotational coupling 120 may not bear or transfer a main lifting force between carrier 124 and load 130; control system rotational coupling 120 may only bear the weight of SLCS 105 and of tension on control lines 110.

As noted, SLCS 105 is secured to load 130 by one or more control lines 110, wherein the control lines 110 secure winches 195 (labeled in FIG. 4, FIG. 5A, FIG. 5B, and FIG. 6) to load 130. Winches 195 may be used by SLCS 105 to at least one of i) detect slack in control lines 110 and or ii) to produce and or maintain tension on control lines 110. SLCS 105 may produce and or maintain tension on control lines 110 to transfer force, such as torque, from SLCS 105 and from one or more fan units 155 of SLCS 105, to load 130. Without tension on control lines 110, the ability of SLCS 105 to react to movement of and to control load 130 may be severely compromised and or may be delayed. Delay in reaction time between SLCS 105 and load 130 may severely hinder ability of SCLS 105 to transfer force to load 130. Thus maintaining tension on control lines 110 may effect the ability of SLCS 105 to control load 130, on power use by SLCS 105, on battery life of SLCS 105, and on mission objectives.

To develop force to be transferred to load 130, SLCS 105, SLCS 105 may use thrust from, for example, fan units 155. Fan units 155 may be opposite each other, on two or more sides of SLCS 105. As illustrated in these examples, each fan unit 155 comprises two EDFs generally oriented opposite one another. Thrust from EDFs in fan units 155, as well as winches 195 and tension on control lines 110, may be used by operational components of SLCS 105 discussed in relation to FIG. 14, operational routine(s) of SLCS 105 discussed in relation to FIG. 15, and decision and control routine of SLCS 105 discussed in relation to FIG. 16, to control or influence load 130. Alternative to fan units 155, SLCS 105 may comprise one or more flywheels; an acceleration of flywheels and or change in orientation of a spinning flywheel may impart torque on SLCS 105, which torque may be transferred to load 130 with winches 195 and control lines 110.

Figure 2:
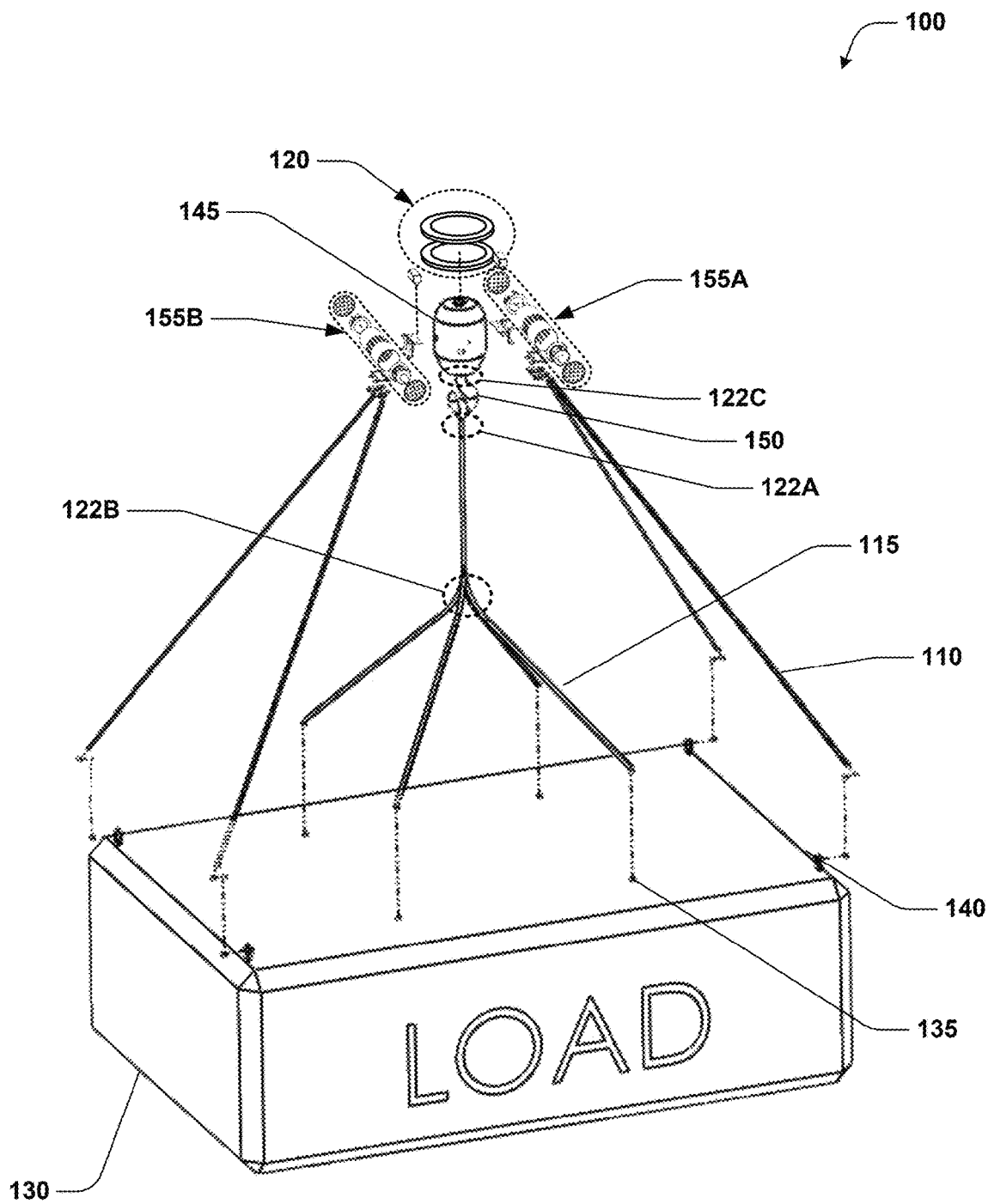
FIG. 2 is the carrier hook and SLCS of FIG. 1, partially exploded, in accordance with an embodiment.

FIG. 2 illustrates an embodiment of carrier hook and SLCS 105 of FIG. 1, partially exploded, in accordance with an embodiment. In addition to elements called out and described in relation to FIG. 1, called out are head block 145, head block hook 150, control system rotational coupling 120, fan unit 155A and fan unit 155B, control line-load securement(s) 140, and load bearing connector line-load securement(s) 135. A view with more detail of certain of these components is also provided in FIG. 4.

Figure 3:
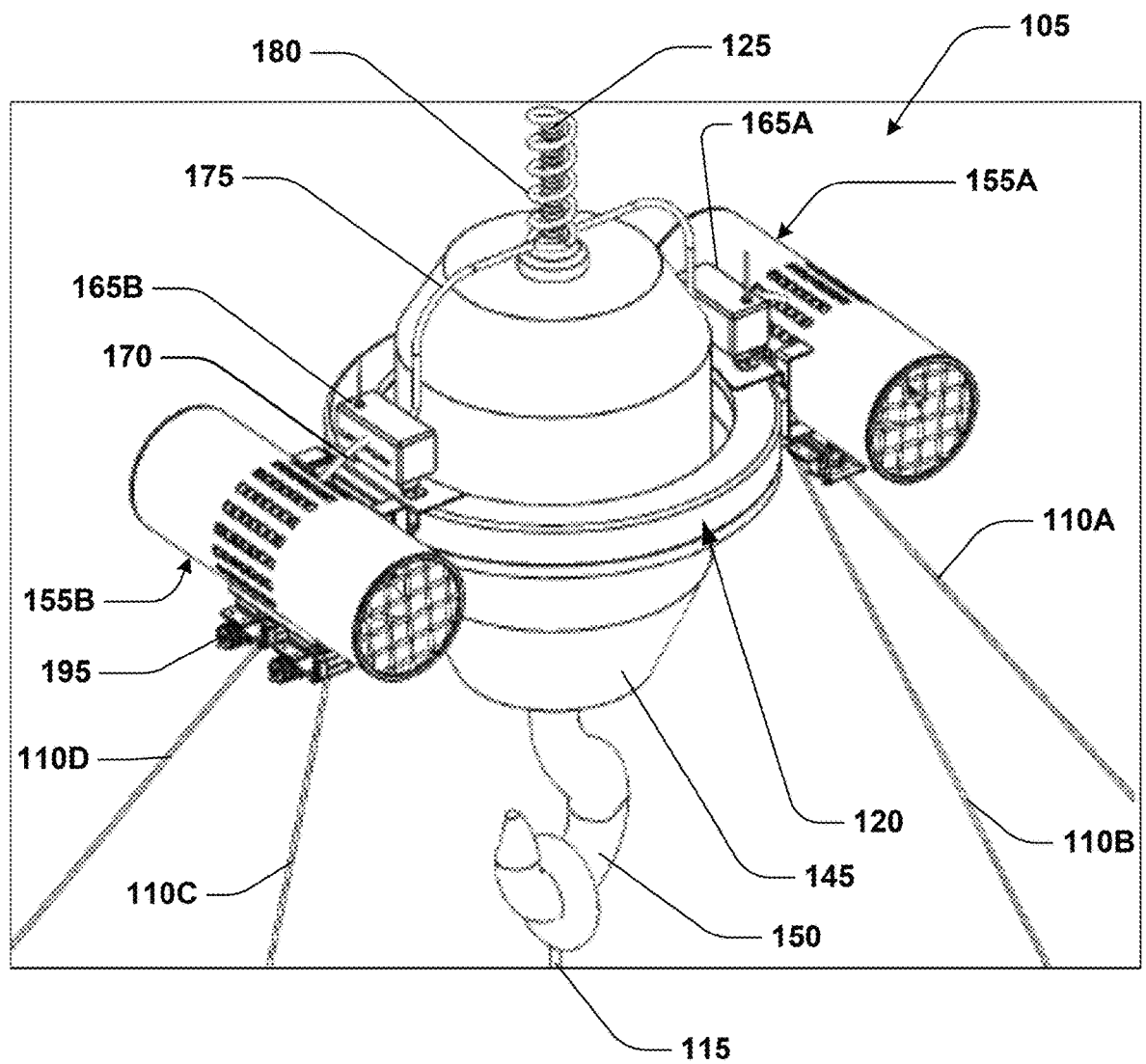
FIG. 3 is a portion of the carrier hook and SLCS of FIG. 1, in accordance with an embodiment.

FIG. 3 illustrates an embodiment of a portion of carrier hook and SLCS 105 of FIG. 1, in accordance with an embodiment. In FIG. 3, illustrated and labeled elements comprise the following: one or more control line 110A-110D, which may extend down to load 130 (in embodiments, a different number of control lines may be used); load bearing connector line(s) 115 (in embodiments, a different number of load bearing connector lines may be used); head block hook 150; head block 145 (which, in combination with head block hook 150 may also be referred to as a "carrier hook"); control system rotational coupling 120; fan unit 155A and fan unit 155B; fan electronics conduit 170; electronics box 165A and electronics box 165B; main power conduit 180; main power feeder conduit 175; and main load bearing line 125. Electronics box 165A and electronics box 165B may contain electronics, computers, and algorithms or modules and other operational components discussed in relation to FIGS. 14 to 16. Main power conduit 180 may extend up to carrier 124 and provide power, such as electrical power, to SLCS 105 from a power source in carrier 124. In addition or alternatively, SLCS 105 may comprise battery packs to provide some or all power to SLCS 105. In addition to providing power, main power conduit 180 or another conduit may relay control and or sensor signals between SLCS 105 and other sources or destinations of control and or sensor signals. As noted, main load bearing line 125 may extend up to carrier 124, such as to a hoist of carrier 124.

Figure 4:
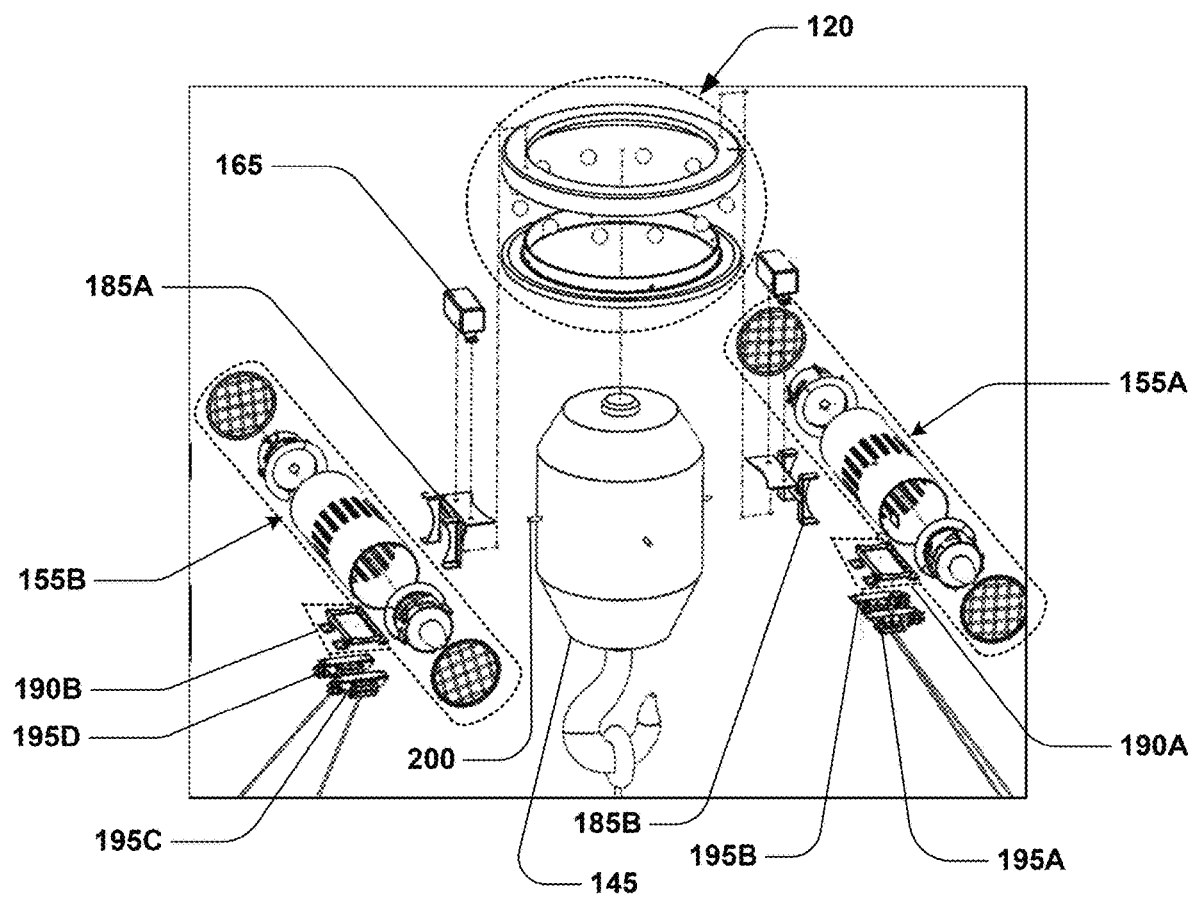
FIG. 4 is an exploded view of portions of the carrier hook and SLCS of FIG. 1, in accordance with an embodiment.

FIG. 4 illustrates an exploded detail of an embodiment of a portion of carrier hook and SLCS 105 of FIG. 1. Illustrated and labeled elements comprise the following: control system rotational coupling 120. Control system rotational coupling 120 carries fan units 155, electronics box 165, winch bracket 190A and 190B, which may secure winches 195A through 195D to fan unit 155A and 155B and which may hold electronics box 165 (electronic box 165 may be located in a different location, such as on fan unit 155); winches 195A through 195D. Control system rotational coupling 120 allows SLCS to rotate separately from head block 145, without imparting significant torque on head block 145 or main load bearing line 125, e.g. where only friction in control system rotational coupling 120 would transfer torque from SLCS 105 to head block 145, wherein such friction-based torque transfer would be relatively insignificant and less than a capacity of main load bearing line 125 to absorb and resist torque. Control system rotational coupling-head block securements 200 are one or more securement structures, such as bolts, which to secure control system rotational coupling 120 to head block 145.

Figure 5:
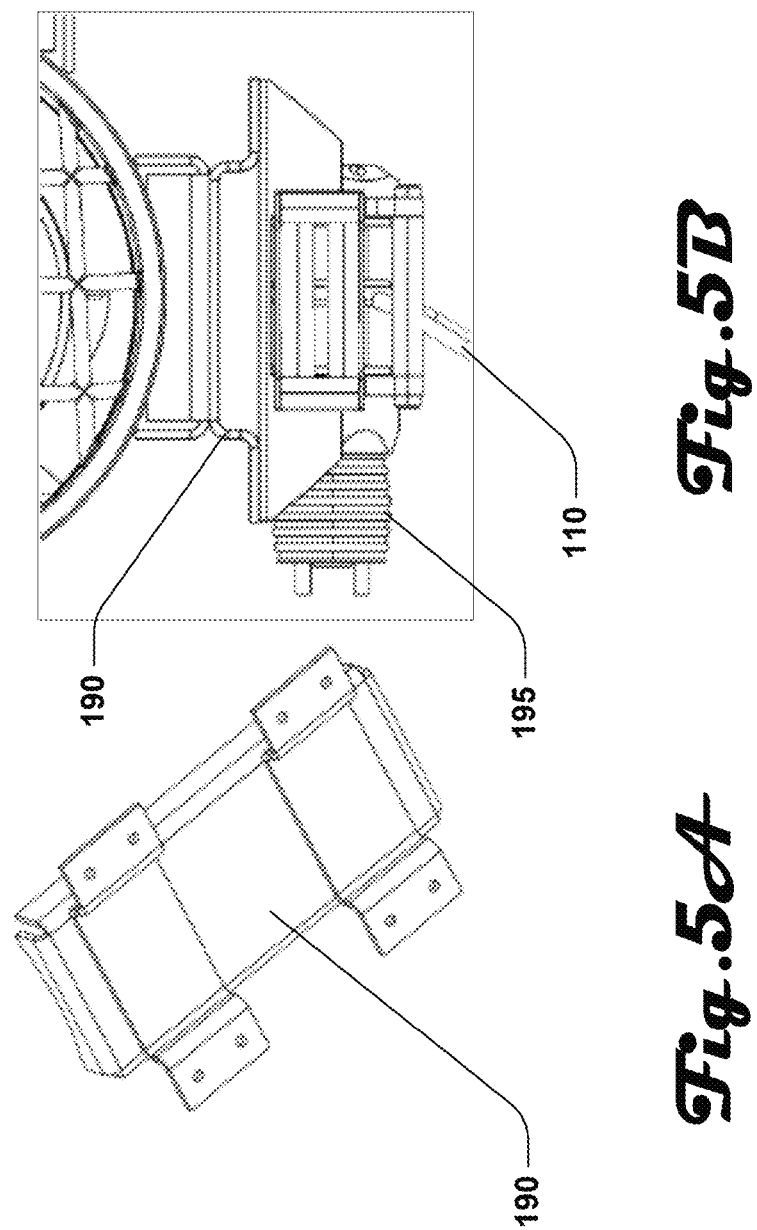
FIG. 5A is a detail of a winch bracket, in accordance with an embodiment.
FIG. 5B is a detail of a winch bracket, a winch, and a portion of a fan unit, in accordance with an embodiment.

FIG. 5A illustrates an embodiment of winch bracket 190, which may secure winch 195 to fan unit 155 and, via fan unit bracket 185, to control system rotational coupling 120 and, thereby, to head block 145. Winch 195 may be secured to control system rotational coupling 120 via other structures, such as to fan unit bracket 185 and or another dedicated structure.

FIG. 5B illustrates an embodiment of winch bracket 190 and winch 195. In combination with operational components and modules of a suspended load control system discussed in relation to FIGS. 14 to 16, winch 195 or data from winch 195 may be used to sense an amount of strain or tension on one or more control line(s) 110. Operational components and modules of a suspended load control system discussed in relation to FIGS. 14 to 16 may use winch 195 to draw tension on one or more control line(s) 110. Sensed tension or lack of tension on control line(s) 110 may indicate and or may be produced by desired or undesired motion of load 130. Tension may be imparted on control line(s) 110 by winch 195 to impart force on load 130; such force may be communicated between winch 195 and, for example, fan unit 155, such as when one or more fan unit 155 is operating to provide a force, and or on head block 145, which may cause a center of gravity of load 130 to bias in a direction relative to head block 145 and main load bearing line 125.

Figure 6:
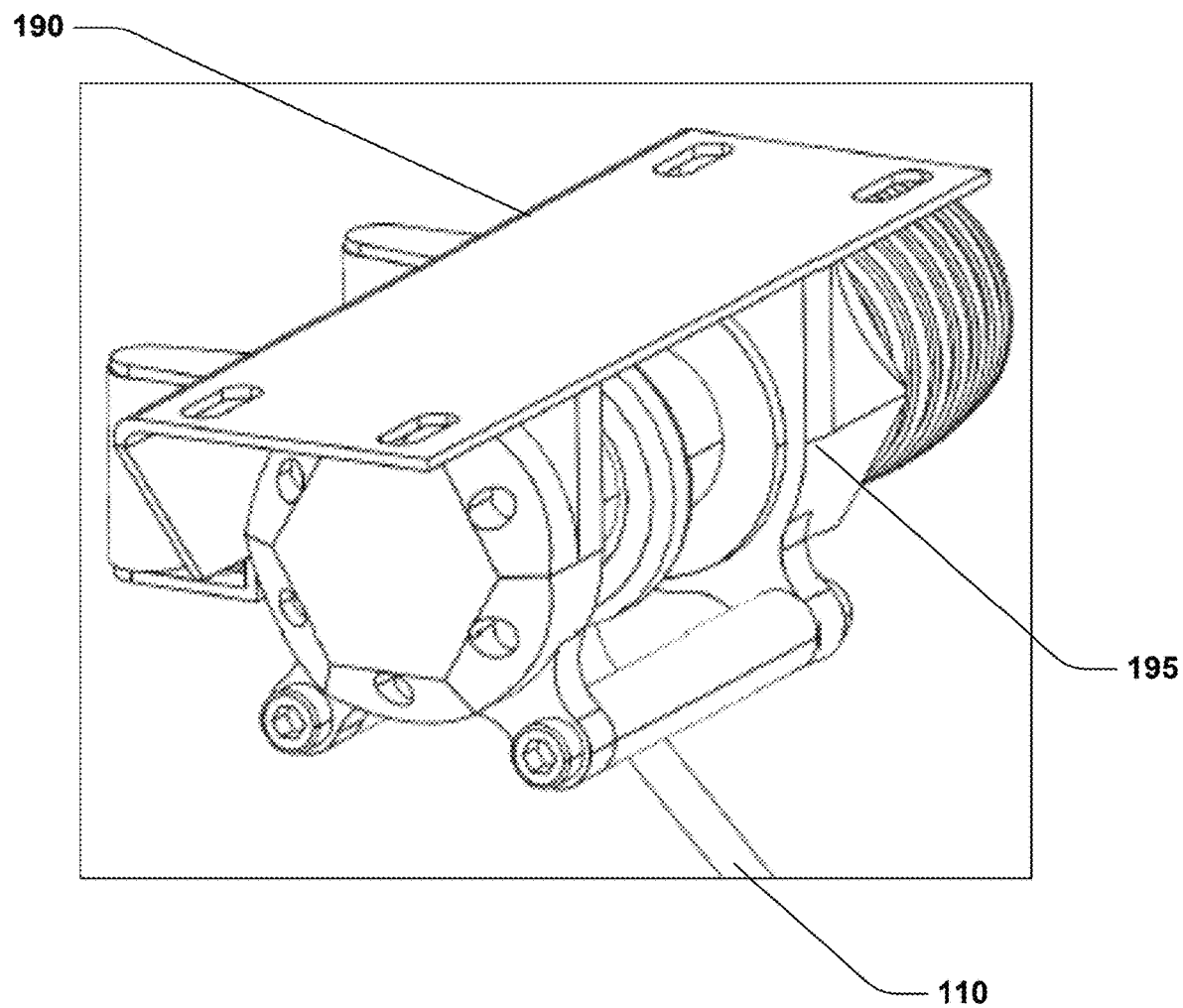
FIG. 6 is a detail of a winch and control line, in accordance with an embodiment.

FIG. 6 illustrates an embodiment of winch bracket 190, winch 195, and control line 110 extending from winch 195. More than one control line 110 or control line feeder lines may extend from winch 195. Winch bracket 190 may place winch 195 distal relative to a central vertical axis (or Y axis) of main load bearing line 125. As noted, winch brackets 190 and winches 195 may be symmetrical about the central vertical axis (or Y axis) of main load bearing line 125. In embodiments, a greater or lesser number of winches 195 and or winch bracket 190 may be used. Winch 195 may comprise one or more tension sensor to sense tension on winch 195 from control line 110. A tension sensor may comprise, for example, a position encoder, a torque sensor, a stain gauge, a spring-loaded and instrument guide for control line 110, and the like. Winch 195 may further comprise, or incorporate into a tension sensor, sensors to detect and report an amount of control line 110 which has been payed out of or into winch 195.

Figure 7B:
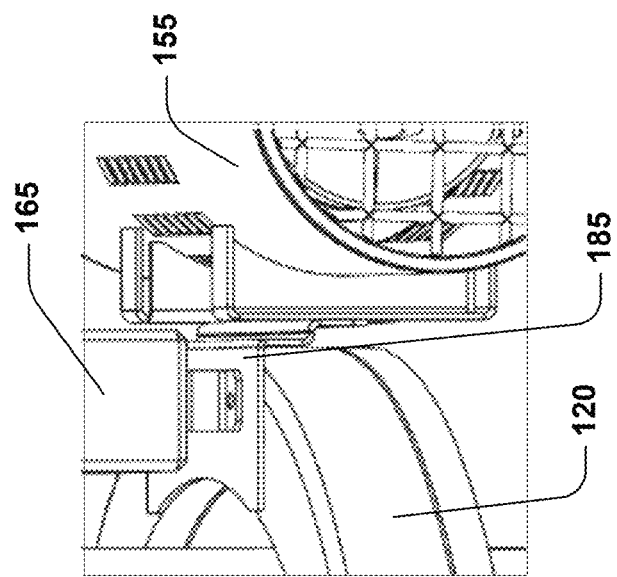
FIG. 7B is a detail of a control system rotational coupling, fan unit bracket, fan unit, and electronics box, in accordance with an embodiment.
Figure 7A:
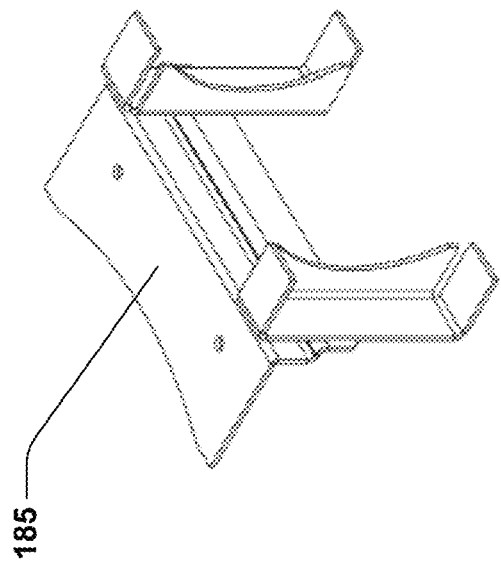
FIG. 7A is a fan unit bracket, in accordance with an embodiment.

FIG. 7A illustrates an embodiment of fan unit bracket 185, which may secure fan unit 155 to control system rotational coupling 120, such as, for example, via bolts, welding, straps, or the like. In embodiments, other components may be intermediate between fan unit 155 and control system rotational coupling 120.

FIG. 7B illustrates an embodiment of control system rotational coupling 120 secured to fan unit bracket 185, fan unit 155, and electronics box 165.

Figure 8:
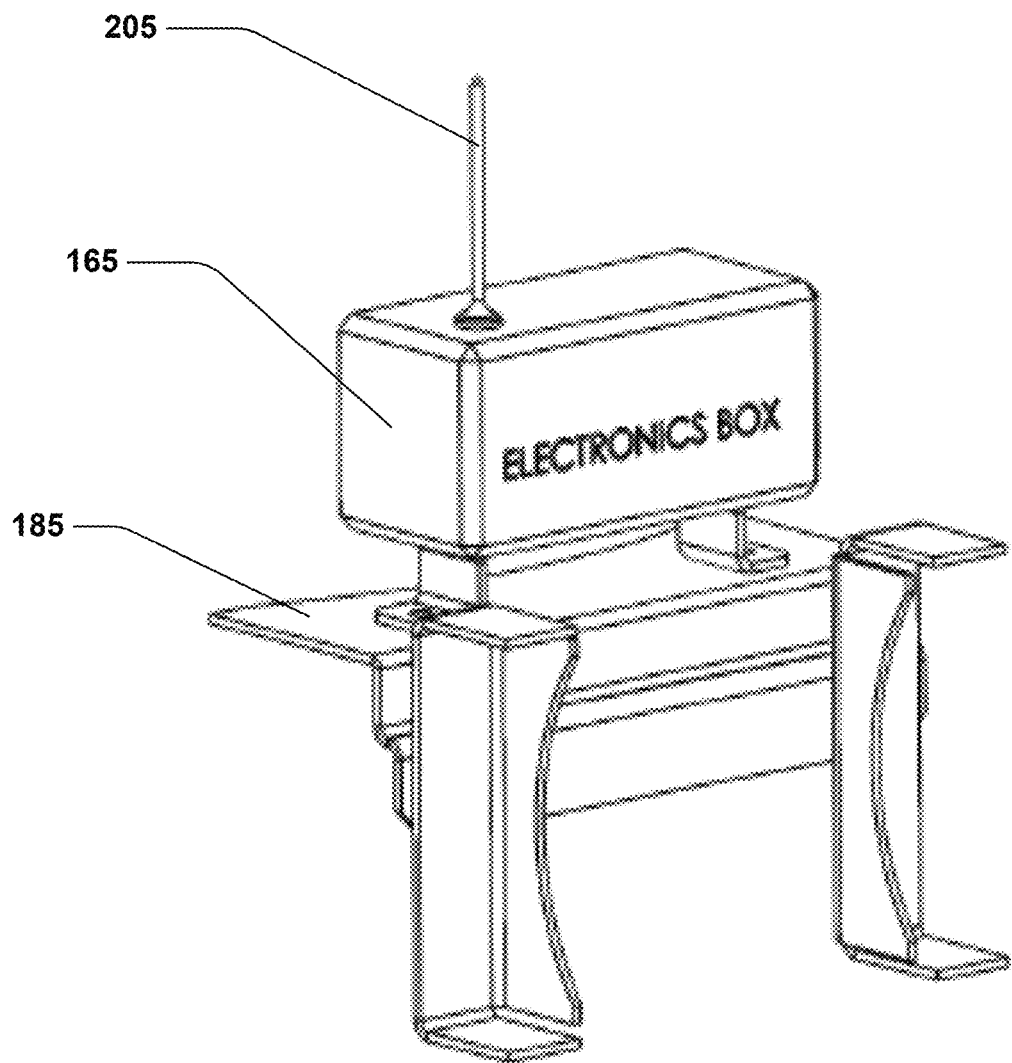
FIG. 8 is a fan unit bracket and electronics box, in accordance with an embodiment.

FIG. 8 illustrates an embodiment of electronics box 165 secured to fan unit bracket 185. In this embodiment, electronics box 165 comprises control system antenna 205. Control system antenna 205 may allow wireless communication, such as with remote pendant 235 and or with components in carrier 124, and or with wireless sensors, sensor input, or sensor output, such as with respect to GPS, LIDAR, RADAR, SONAR, image (visible, infrared, etc. camera), acoustic (microphone), inertial, gyroscopic sensors and the like.

In an embodiment, electronics box 165 may comprise, for example, power supply system, power regulators, relays, buffers, or the like, to provide regulated power to a fan unit. In an embodiment, electronics box 165 may comprise batteries. In an embodiment, electronics box 165 may comprise, for example, electronic speed controllers, motor drivers, and the like, to control electrical power to a fan unit.

Figure 14:
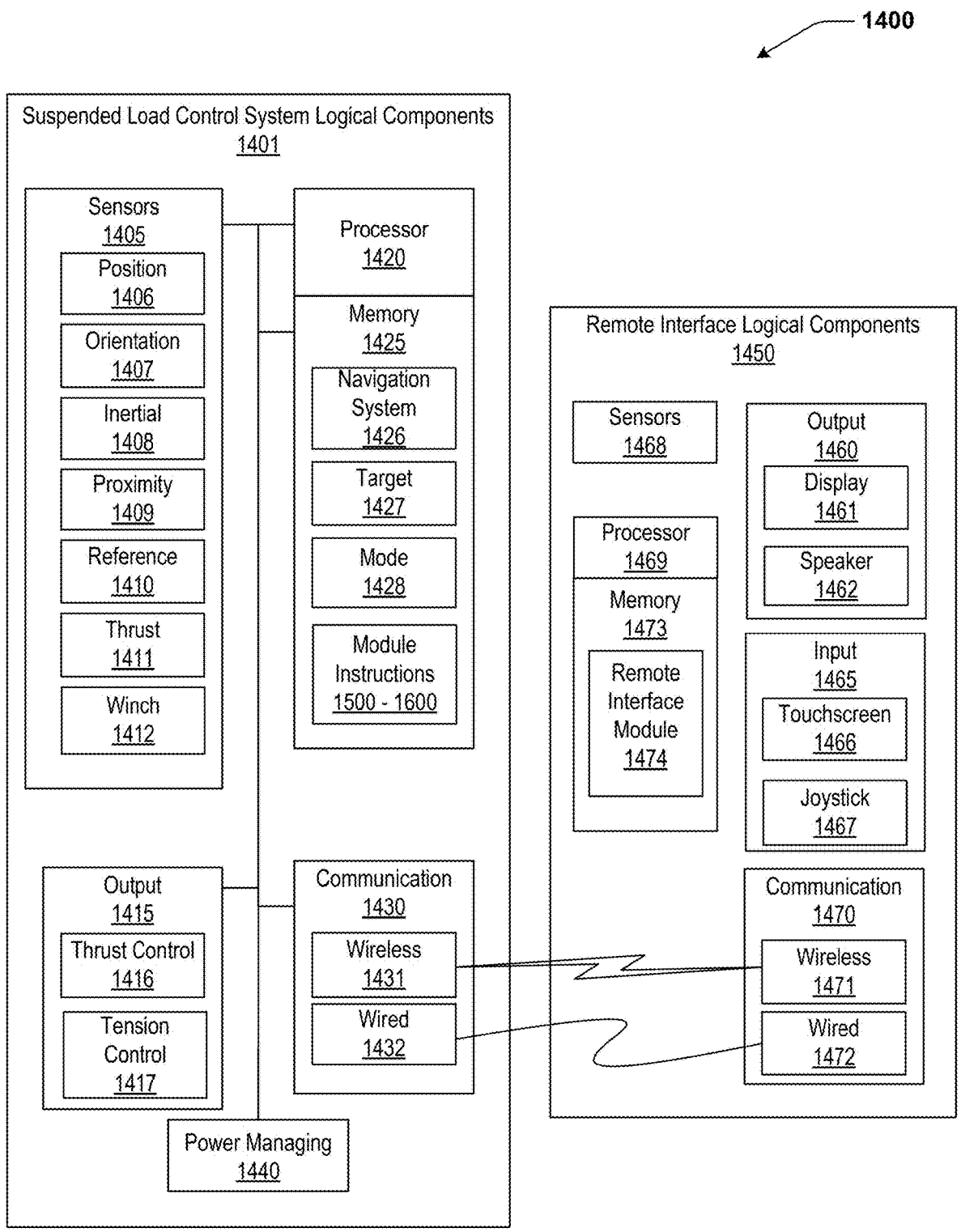
FIG. 14 schematically illustrates operational components of a suspended load control system including a remote pendant interface in accordance with one embodiment.
Figure 15:
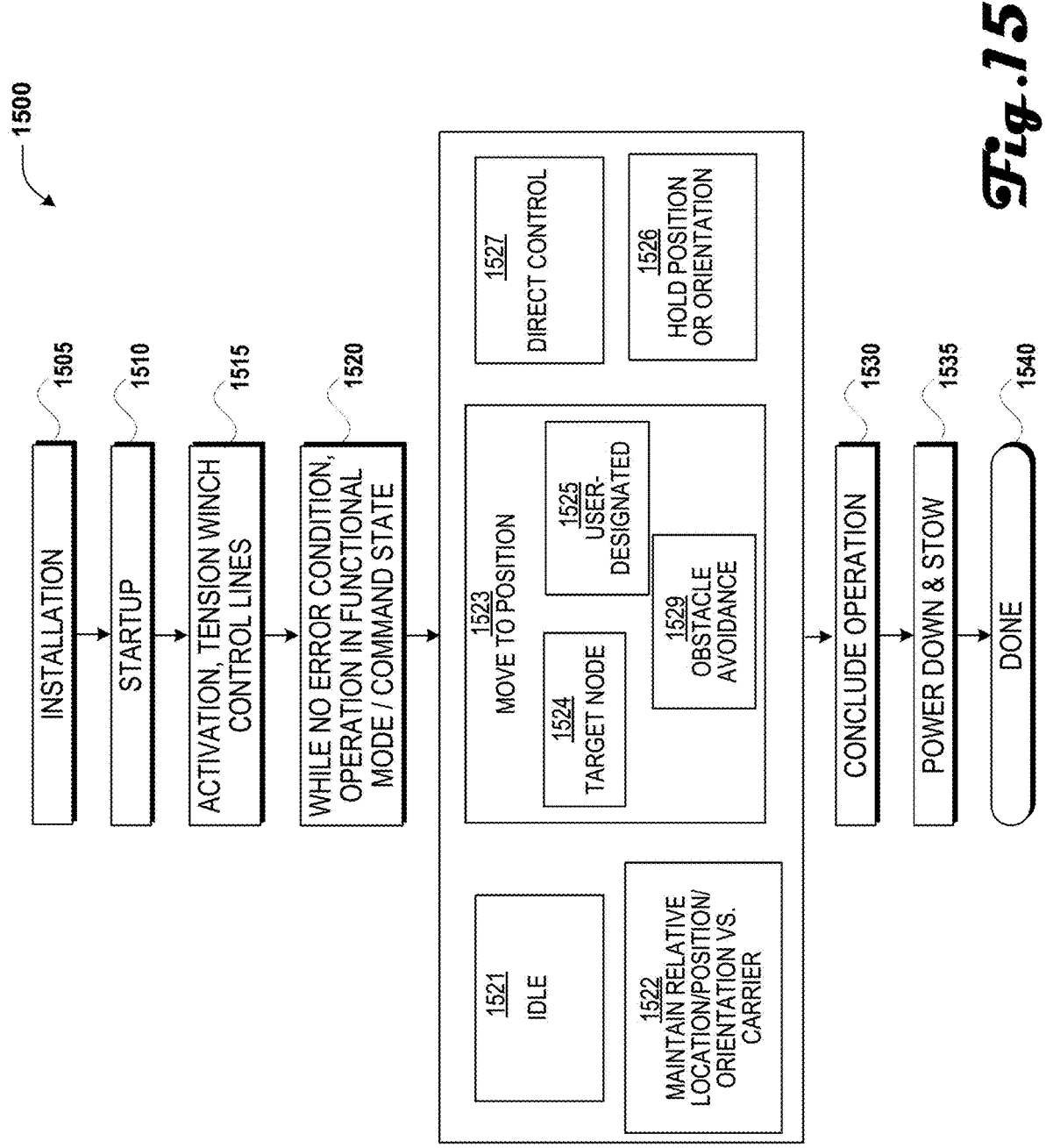
FIG. 15 illustrates an operational routine of a suspended load control system including multiple modes or command states in accordance with one embodiment.
Figure 16:
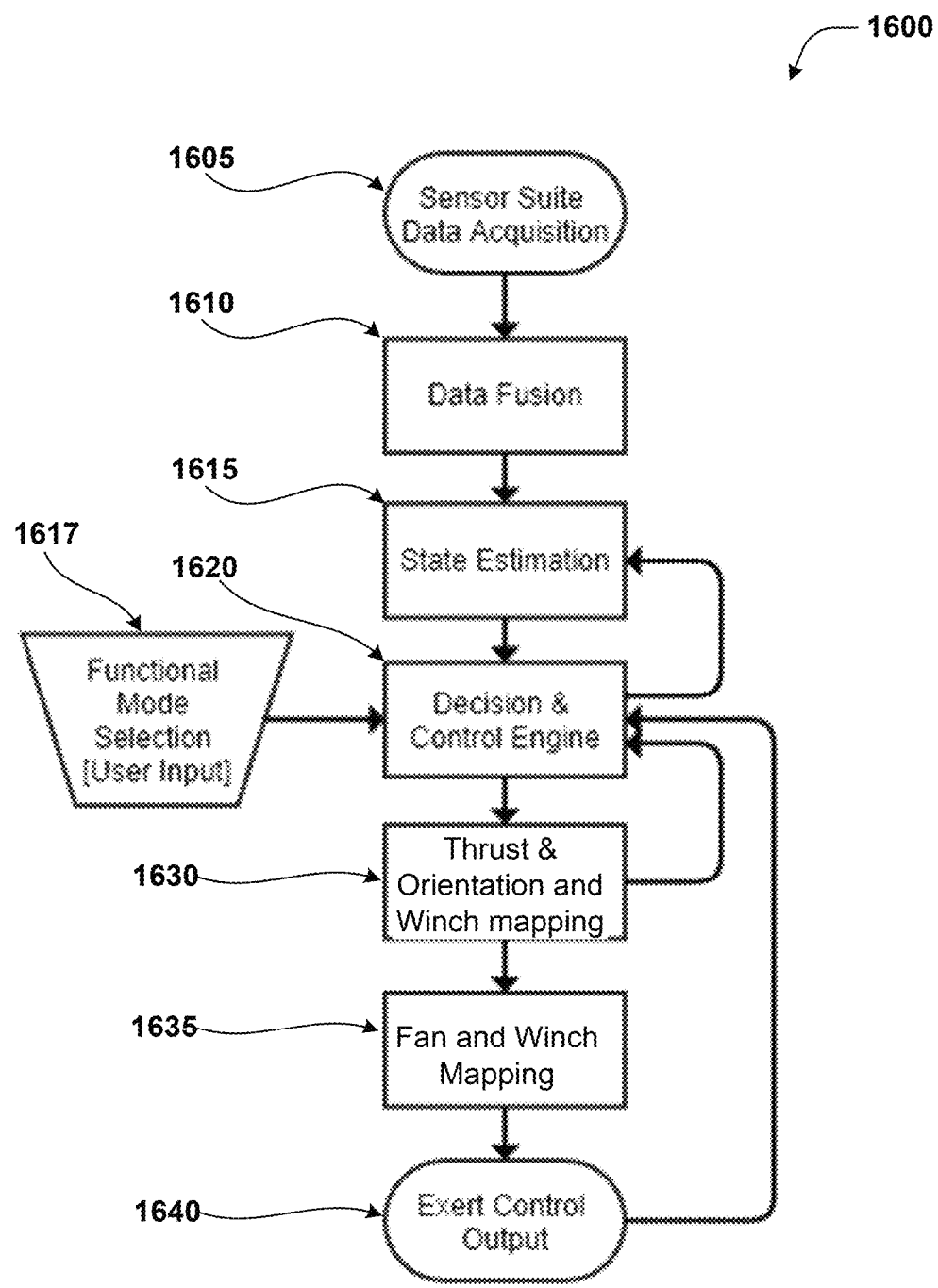
FIG. 16 illustrates a decision and control routine of a suspended load control system in accordance with one embodiment.

In an embodiment, electronics box 165 may comprise, for example, operational components (e.g. computer processor and memory), operational routine, and a decision and control routine of a suspended load control system, discussed in relation to FIGS. 14 to 16.

Figure 9:
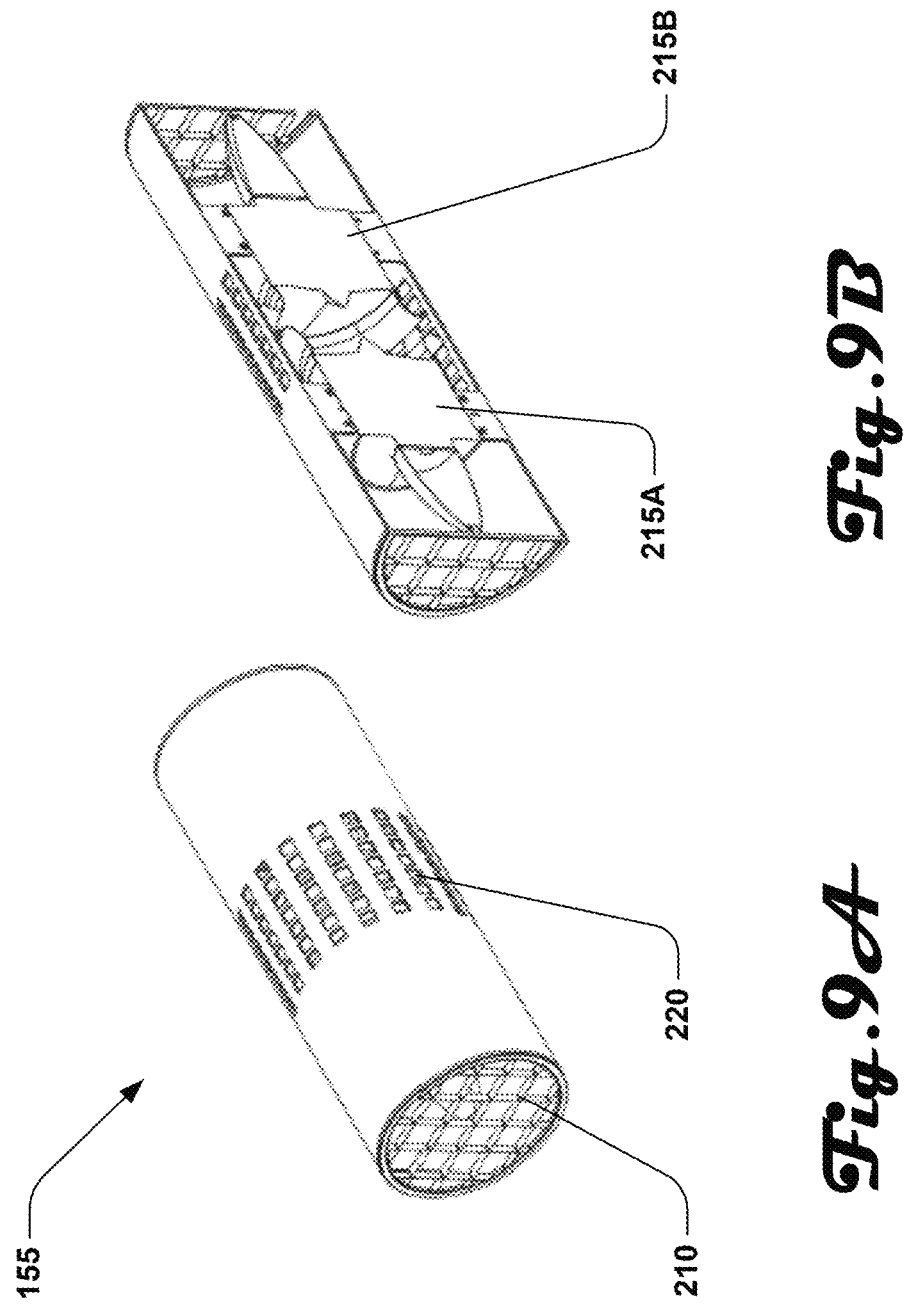
FIG. 9A is a fan unit, in accordance with an embodiment.
FIG. 9B is the fan unit of FIG. 9A with vertical cross-section through a center line, in accordance with an embodiment.

FIG. 9 illustrates an embodiment of fan unit 155, in which fan unit 155 comprises the following: fan unit outlet cover 210, which may discourage ingress of debris into fan unit 155 and which allows air or another thrust fluid to exit fan unit 155; fan inlet 220, which may discourage ingress of debris into fan unit 155 and may allow air or another thrust fluid to enter fan unit 155; and fan 215A and fan 215B. Fan 215A and fan 215B may be ducted fans. Fan 215A and fan 215B may be driven by electric motor(s), with electricity obtained from a battery pack, such as a batter pack in electronics box 165 and or from carrier 124 and provided to fan 215A and or fan 215B by electronics box 165 through fan electronics conduit 170, potentially in conjunction with control signals and or potential in conjunction with generation of control signals, such as electromagnetic frequency (EMF) and or encoder feedback from electric motors in fan 215.

Figure 10:
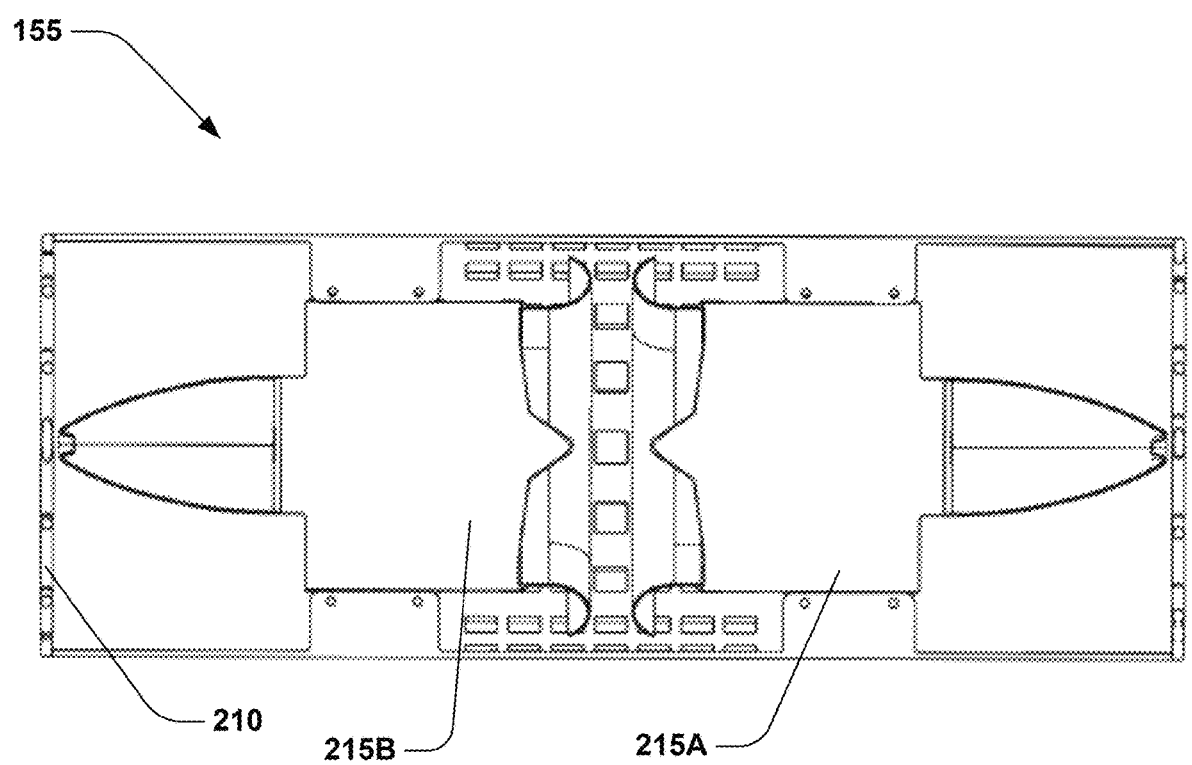
FIG. 10 is the fan unit of FIG. 9A with vertical cross-section in elevation view, in accordance with an embodiment.

FIG. 10 illustrates an embodiment of fan unit 155, including fan inlet 220, fan 215A and fan 215B. Fan 215A and fan 215B may be oriented 180 degrees opposite one another, such that each produce thrust opposite the other. Fan 215A and fan 215B may be oriented other than 180 degrees opposite one another.

Fan units 155 may comprise a cowl which protects one or more fan(s). The cowl may be hardened, to withstand impact with the environment. The cowl unit may be made of metal, plastics, composite materials, including fiber reinforced resin, and the like. The fan in fan unit 155 may comprise blades and motor(s), such as electric motor(s). The electric motors within a fan may be sealed against dust, sand, water, and debris.

Fans in each fan unit propel thrust fluid (such as air) in fixed directions, such as fixed directions opposite each other; e.g. offset by 180 degrees. In other embodiments, a fewer or greater number of fan units and/or fans may be used. In other embodiments, the fan units and/or fans may be aligned other than as illustrated, e.g., offset by greater or fewer than 180 degrees, with or without offset along other of the axis. A mechanical steering component may be included (not illustrated) to dynamically reposition a fan unit and/or fan within a fan unit.

Fans in individual of the fan units 155 may be activated separately, with different power, to produce thrust vectoring or thrust vector control of an assembly of fans, such as of SLCS 105. For example, to produce clockwise yaw (with directions relative to FIG. 11), a fan in fan unit 155B may be activated by itself or in conjunction with an opposing fan on an opposite side of fan unit 155A to produce torque. To produce lateral translation forces on SLCS 105 and load 130, fans on a same side of fan unit 155A and 155B may be activated. Simultaneous lateral translation and rotation may be produced.

Figure 11:
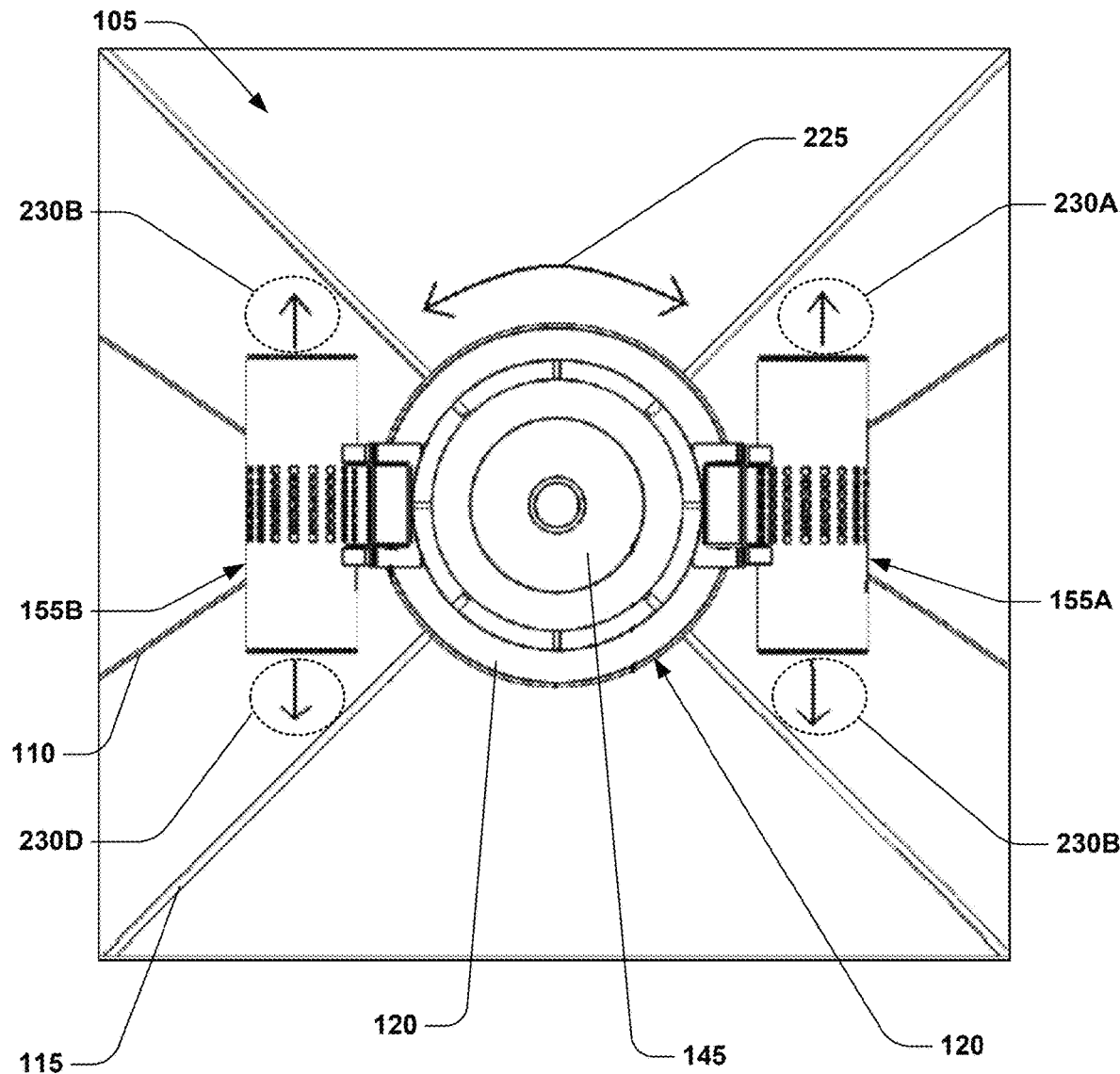
FIG. 11 is a top plan view of a carrier hook and SLCS, in accordance with an embodiment.

FIG. 11 illustrates an embodiment of SLCS 105 in which thrust vector(s) 230A through 230D may be produced by fan units 155A and 155B. Thrust vector(s) 230A through 230D may be controlled by, for example, operational components of a suspended load control system discussed in FIGS. 14 to 16 to produce, for example rotational force(s) 225 (e.g. yaw forces or torque) or translational forces (e.g. forces along one or both X and Z axis) which may be transmitted between SLCS 105 and load 130 by one or more of control line(s) 110. Lifting and translational forces from carrier 124 may be transmitted to load by one or more load bearing connector line(s) 115.

Figure 12:
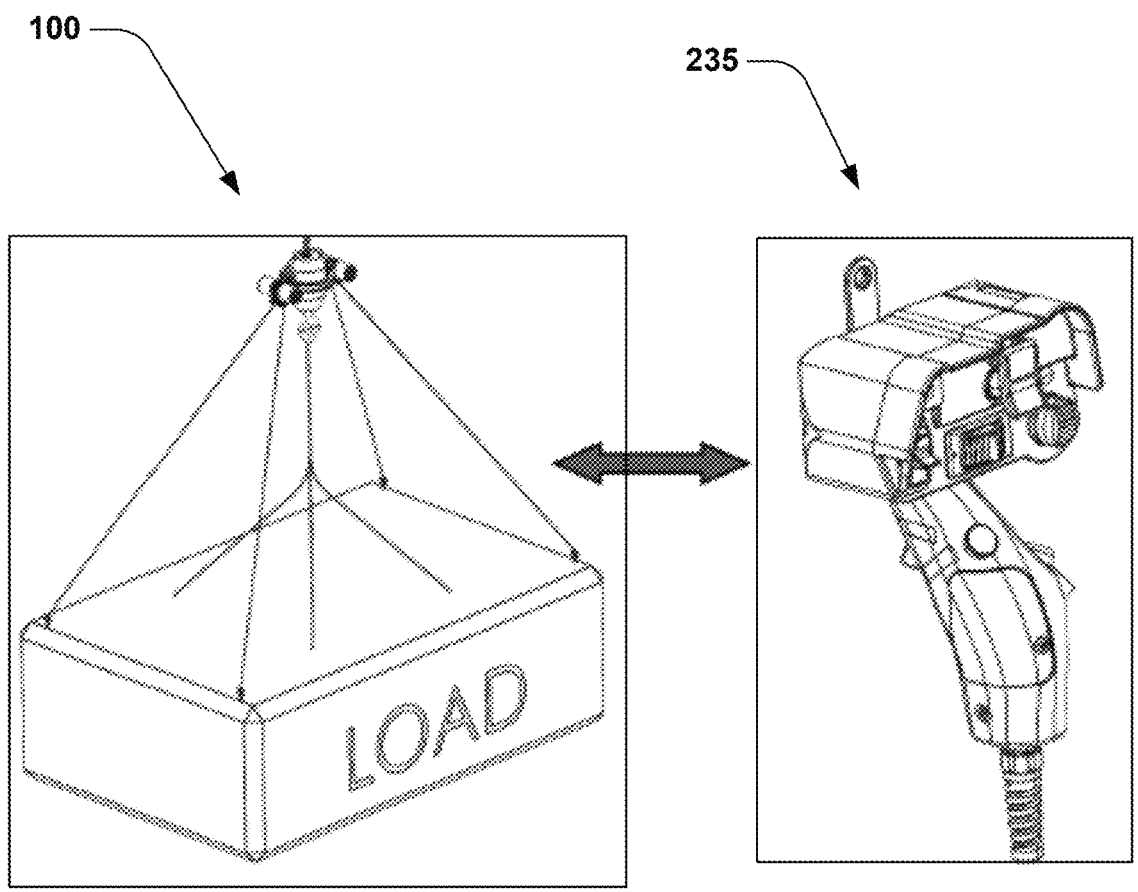
FIG. 12 is a carrier hook, SLCS, and remote pendant, in accordance with an embodiment.

FIG. 12 illustrates an embodiment of SLCS and load 100 in wireless communication with remote pendant 235. Remote pedant 235 may provide and or relay control signals and or sensor information between SLCS 105, remote pendant 235, a user, or other sources or destinations, such as systems in a carrier. Other sources or destinations may be in wireless or wireline communication with one or both of SLCS 105 and remote pendant 235.

Figures 13A, 13B, 13C:
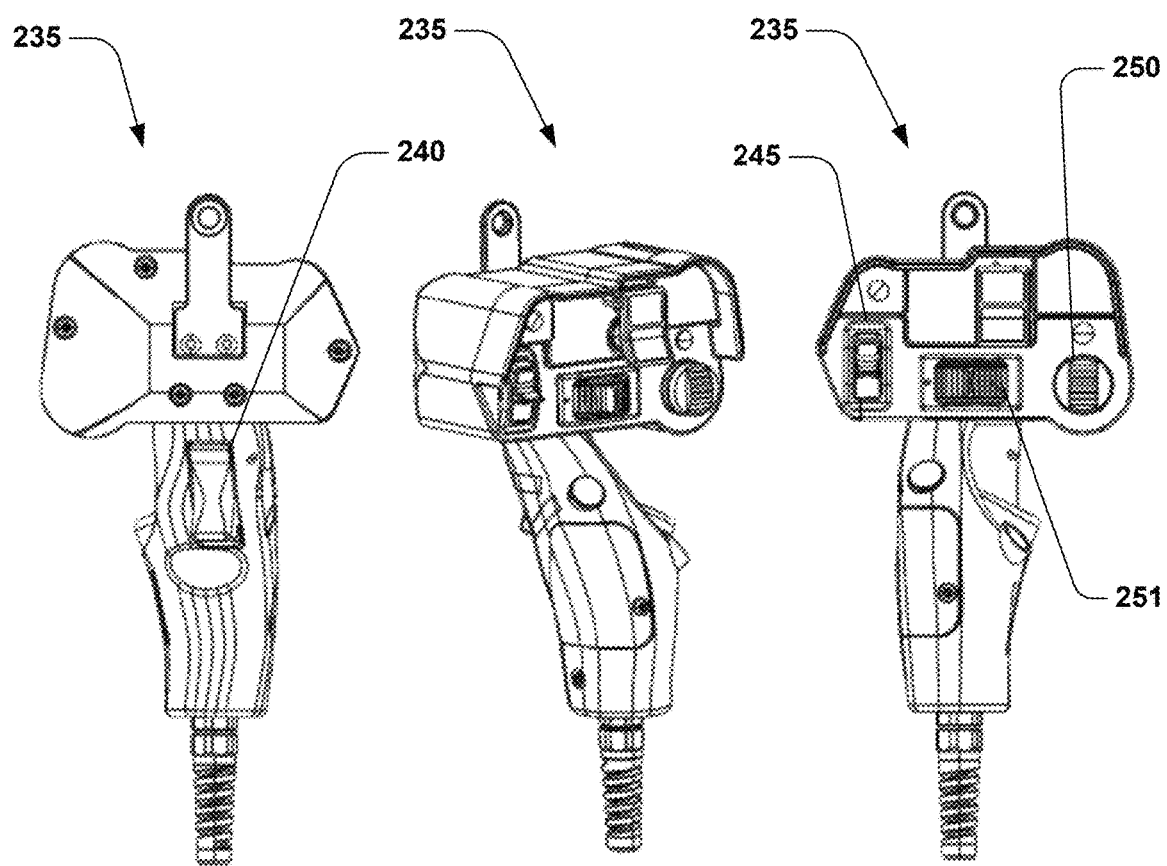
FIG. 13A is a back elevation view of the remote pendant, in accordance with an embodiment.
FIG. 13B is an oblique view of the remote pendant, in accordance with an embodiment.
FIG. 13C is a front elevation view of the remote pendant, in accordance with an embodiment.

FIG. 13A illustrates an embodiment of remote pendant 235 comprising, for example, activation controller 240. FIG. 13B illustrates another view of an embodiment of remote pendant 235. FIG. 13C illustrates another view of an embodiment of remote pendant 235 comprising, for example, on/off switch 245, state selector 250, and manual/rotational control 251. On/off switch 245 may be used to turn on remote pendant 235. State selector 250 may be used to select a command state of SLCS 105, as may be discussed in relation to FIG. 15. Activation controller 240 may be used to activate or deactivate SLCS 105 in or relative to a selected command state. Manual/rotational control 251 may be used to manually activate fans to rotate or translate load 130.

FIG. 14 schematically illustrates operational components of a suspended load control system ("SLCS") 1400 including suspended load control system logical components 1401 and remote interface logical components 1450 in accordance with one embodiment. Within suspended load control system logical components 1401 are sensor suite 1405, which may include position sensors 1406, orientation sensors 1407, inertial sensors 1408, proximity sensors 1409, reference location sensors 1410, thrust sensors 1411 (used in relation to fans), winch sensors 1412 (used in relation to winch(es) in an SLCS, such as to sense tension on winches and or a length of a winch control line payed out from or wound up on a winch), and cameras. Some or a portion or components of sensors 1405 may be physically located outside of electronics box 165, such as at a location where a sensed condition occurs.

SLCS processing capacity or processor 1420 includes, for example, a computer processor and or microcontrollers. SLCS memory 1425 generally comprises a random-access memory ("RAM") and permanent non-transitory mass storage device, such as a solid-state drive, and contains, for example, navigation systems 1426, target data 1427, mode or command state information 1428, and software or firmware code, instructions, or logic for one or more of operational module 1500 and suspended load control decision and thrust control module 1600. Communication systems 1430 include wireless systems 1431 such as a wireless transceiver and wired systems 1432. SLCS output 1415 includes thrust control 1416 and tension control 1417 via, for example, power controllers and or ESCs. Power managing systems 1440 regulate and distribute the power supply from, e.g., batteries or power from a crane or other carrier. A data bus couples the various internal systems and logical components of load control system logical components 1401.

An interactive display, interactive control, remote pendant, positional unit, or target node, all of which may also be referred to herein as "remote interface", may be a computational unit comprising one or more of remote interface logical components 1450; such a unit may be self-powered or hardwired into another device, such as an airframe, carrier, a remote pendant (an embodiment of which is illustrated in FIGS. 13A through 13C), a tablet computer, or the like. Remote interface logical components 1450 may receive data from and/or send data to the SLCS, e.g., through wireless or wireline conduits and communication systems. Data from the SLCS may be displayed or communicated on or via display 1461 of remote interface logical components 1450; the data may be parsed and converted to auditory, tactile, or visual cues. Remote interface logical components 1450 may also communicate to the SLCS the operator's desired command states and operational instructions, as discussed below.

Remote interface logical components 1450 may be in communication with load control system logical components 1401 via communication systems 1470, which may be wireless 1471 or wired 1472. Output 1460 from remote interface logical components 1450 may include information displayed on a screen or display 1461, and auditory cues or access to remote audio (such as audio detected by sensors in a load) via audio output 1462. Output 1460 may also output tactile cues. Input 1465 to remote interface logical components 1450 to control an SLCS may include commands through a touchscreen 1466 or a joystick 1467, including, for example with reference to FIGS. 13A through 13C, through activation controller 240, on/off switch 245, state selector 250, and manual/rotational control 251. In embodiments, manual/rotational control 251 may activate fans on opposite sides of SLCS, to produce, for example, a rotational force or torque on load 130. In embodiments, additional control(s) may be provided to, for example, activate fans on a same side of SLCS to produce, for example, a translational force on load 130. In embodiments, additional control(s) may be provided to, for example, activate one or more winches to tighten control lines. In various embodiments, remote interface logical components 1450 may comprise one or more physical and/or logical devices that collectively provide the functionalities described herein.

Aspects of the system may be embodied in a specialized or special purpose computing device or data processor that is specifically programmed, configured, or constructed to perform one or more of the computer-executable instructions explained in detail herein, in conjunction with suitable memory. Aspects of the system may also be practiced in distributed computing environments where tasks or modules are performed by remote processing devices and memory that are linked through a communications network, such as a local area network (LAN), wide area network (WAN), or the Internet. In a distributed computing environment, modules may be located in both local and remote memory storage devices. As schematically illustrated in FIG. 14, load control system logical components 1401 and remote interface logical components 1450 may be coupled by a wired or wireless network.

Load control system logical components 1401 may work with a remote positional unit, remote interface, or target node comprising one or more remote interface logical components 1450, in accordance with one embodiment. The remote positional unit, remote interface, or target node may comprise an internal or external sensor suite, such as sensors 1468, configured to communicate, such as wirelessly, with load control system logical components 1401 as a positional reference. Sensors 1468 may be similar to or a subset of sensors 1405. If sensors 1405 are considered the primary sensor suite, a secondary sensor suite location may be in the platform, crane, aircraft, or other carrier from which main load bearing line 125 is suspended, and a tertiary sensor suite location may be a location of interest for the load (e.g., for positioning to obtain or deliver the load). Remote interface logical components 1450 may further comprise processor 1469 and memory 1473, which may be similar to processor 1420 and memory 1425. Memory 1473 may comprise software or firmware code, instructions, or logic for one or more modules used by the remote positional unit, remote interface, target node, or remote interface, such as remote interface module 1474. For example, remote interface module 1474 may provide control and interface (e.g. input/output) for a remote positional unit, remote interface, target node, or remote interface, such as to allow it to be turned on/off, to pair it with an SLCS, to input instructions, or the like.

A remote positional unit or remote interface may include a transceiver configured to communicate with load control system logical components 1401 via a wireless transceiver and provide a positional reference. For example, a remote positional unit or remote interface may be secured to a helicopter ownship, crane, or other carrier 124 below which a load may be suspended. The remote positional unit, remote interface, or target node may be secured to, e.g., the helicopter, crane, or carrier by magnets, bolts, or any other securement mechanism. The remote positional unit, remote interface, or target node may be placed or dropped to a location on the ground or secured to, e.g., a life preserver or other flotational device, a rescuer, a load to be picked up, a location for a load to be delivered, or an operational specific location.

In some embodiments, the remote positional unit, remote interface, or target node may be made of durable polymer or plastic, large enough to fit into a hand. The remote positional unit, remote interface, or target node may have an external antenna.

Aspects of the load control system logical components 1401 and/or remote interface logical components 1450 may be embodied in a specialized or special purpose computing device or data processor that is specifically programmed, configured, or constructed to perform one or more of the computer-executable instructions explained in detail herein. Aspects of the load control system logical components 1401 and/or remote interface logical components 1450 may also be practiced in distributed computing environments where tasks or modules are performed by remote processing devices that are linked through a communications network, such as a local area network (LAN), wide area network (WAN), or the Internet. In a distributed computing environment, modules may be located in both local and remote memory storage devices. As schematically illustrated in FIG. 14, load control system logical components 1401 and remote interface logical components 1450 may be coupled by a wired or wireless network.

FIG. 15 illustrates an example of operational module 1500 of a suspended load control system ("SLCS") including multiple mode or command state modules in accordance with one embodiment. Instructions of, or which embody, decision and operational module 1500 may be stored in, for example, memory 1425, and may be executed or performed by, for example, processor 1420, as well as by electrical circuits, firmware, and other computer and logical hardware of SLCS with which operational module 1500 may interact. In embodiments, computer processors and memory to perform some or all of operational module 1500 may be remote from SLCS, such as in an auxiliary computer in, for example, a carrier.

In block 1505, a suspended load control system apparatus may be installed onto a load and/or onto a cable from which a load will be suspended. The suspended load control system apparatus need not be powered on for installation.

In block 1510, the suspended load control system ("SLCS") in the apparatus may be started up and operational module 1500 activated. In some embodiments, operational module 1500 may be initialized by press of a button located on the SLCS, such as on electronics box 165 and/or remote pendant 235. Near an external button which may initialize operational module 1500, another button may be present that allows for immediate shut down when pressed. In addition to the initialization interface on the center or control module, operational module 1500 may also be initialized by an operator not directly next to the system. One or more external operators, including but not limited to an operator of a crane or another carrier, a rescuer on the end of the cable, or the like, may initialize operational module 1500 by pressing a button on one or more remote interface linked wirelessly to operational module 1500. One or more modules of a complete SLCS, such as physically separated control unit, fan unit, and the like, may be started up in block 1510 and may be paired to function together. During block 1510, operational module 1500 may determine a relative orientation of fan units or winches which operational module 1500 is to control. This determination may be based on sensor information from the fan units or winches, such as a compass heading sampled from sensor(s) of or associated with each fan unit or winch. This determination may be performed to adjust for fan units or winches which are not available and or which do not have a fixed physical relationship, as may be the case when components of a modular SLCS are deployed on an irregular load, such as a rope or webbing enclosed load, and the fan units or winches may not be parallel or may not have a pre-determined, fixed, physical arrangement. This determination may be used in block 1635 of FIG. 16, with respect to fan and winch mapping. This determination may not be necessary when the SLCS is in a rigid frame and the fan units or winches may be presumed to be parallel to one another. This determination may produce an error condition if the fan units or winches are not within an acceptable orientation range or if they are unavailable.

In block 1515, operational module 1500 may be activated. In block 1515, operational module 1500 may tension one or more winch control lines, such as by activation of winches. Operational module 1500 may sense a tension on one or more winch control lines and or a length of one or more control line, such as with winch 1412 sensors. Operational module 1500 may output information regarding tension on and or length of control lines to, for example, remote interface logical components. Operational module 1500 may determine that an error condition has occurred, such as a winch with insufficient or too much tension, with insufficient or too much winch control line payed out to or from a winch, or the like. An error condition may result in a report to an operator, such as to a remote interface; an error condition may be over-ridden by a command from an operator, such as from a remote interface; an error condition may result in operational module 1500 not proceeding until the error condition is addressed. An error condition may be addressed by an operator re-securing winch control lines and re-initializing or continuing initialization of operational module 1500.

If no error condition or the like in block 1515, in block 1520, a functional mode or command state of operational module 1500 may be called, such as by input from an operator or another process. Maintenance of winch control line tension and absence of an error condition may be a condition to continuation of performance of block 1520. In block 1520, operational module 1500 perform or call suspended load control decision and thrust control module 1600 as a subroutine or submodule, to implement a functional mode or command state. The functional modes or command states of the system may be:

Idle mode 1521: internal systems of the SLCS are operating (e.g., operational module 1500 observes motion of the SLCS and load and calculates corrective action), but the thrusters are shut off or maintain an idle speed only, without action to affect the motion of the load.

Maintain relative position vs. ownship, crane, or carrier mode 1522: stabilizes the SLCS with respect to a slung origin point. For example, when SLCS is suspended with a load below a drop-point of the suspension cable below a crane, the SLCS will stay directly below the drop-point of the suspension cable. Maintain relative position vs. ownship mode 1522 localizes the ownship motion (including the motion of the drop-point) and performs the corrective actions necessary to critically damp any other suspended load motion. If the ownship or drop-point is traveling at a low speed, maintain relative position vs. ownship mode 1522 will couple the velocity or cable tension so the two entities move in unison. Upon a disturbance to the load, maintain relative position vs. ownship mode 1522 provides thrust and or winch control line tension relative to the direction of the disturbance to counteract the disturbance, eliminating swing.

Move to/stop at position mode 1523: will stabilize an SLCS to a fixed position, counteracting the influence of weather or small movements of the crane, carrier, or other suspending platform. This mode has the effect of killing all motion. The operator may send the desired target position to SLCS via a remote interface. This may be accomplished in at least three ways:

Target node position 1524: The operator may place reference location sensors 1468 (e.g. a positional unit or target node) at the desired lowering location. Reference location sensors 1468 may communicate wirelessly with target node position 1524 module to indicate the desired position, and target node position 1524 module responds by maneuvering the SLCS to the desired location while also adjusting winch tension to aid this maneuvering. Remote interface display 1461 may receive and display the location information of both entities.

User-designated position/orientation 1525: The operator may use the remote interface display 1461 to send a designated position (e.g., latitude and longitude coordinates) or orientation as a commanded location or orientation to user-designated position/orientation 1525 module. The system will then steadily direct the suspended load to the desired position or to the desired orientation. The system will simultaneously send feedback to remote interface logical components 1450 regarding position, distance, and orientation information.

Hold position or orientation mode 1526: will resist all motion of an SLCS and maintain current position and or orientation independent of the ownship's motion or external forces. This module has the effect of killing all motion. This module has conditional responses respectively to ownship speed, safety factors, and physical constraints.

Direct control mode 1527: Joystick or similar operation of an SLCS in three degrees of freedom. The operator is able to directly control positioning, rotation, thruster output level, or winch tension, such as, for example, using manual/rotational control 251 or another control. Though operational module 1500 is entirely closed loop and does not require external control during operation, there is an option for user control. The operator is able to provide input to direct control mode 1527 module to directly control positioning, rotation, thruster output level, and winch tension.

Obstacle avoidance module 1529 module: receives and processes sensor information such as to i) to equalize the distance between sensor locations, such as at fan units, and objects, such as obstacles, sensed in the environment or ii) to measure or receive geometry of a load, measure geometry of obstacles sensed in the environment, determine or receive the position, orientation, and motion of the load, and negotiate the load relative to the obstacle, such as through activation of fans and or winches.

In block 1530, the operator completes the operation and retrieves the SLCS.

In block 1535, operational module 1500 may be shut down by pushing a button or the like on an interactive control, by pressing a button on the SLCS apparatus, or the like. If the SLCS apparatus includes collapsible frame, propulsion arms, fan units, or winches, winch control lines may be reeled in, coiled, or withdrawn, arms or frame components may be folded up, retracted, and the like. If the SLCS apparatus includes removable modules, such as for fan units, winches, a housing, a power supply housing, and the like, the modules may be removed and disassembled. The load may be detached from a load hook or the like, and a suspension cable may be detached from a hoist ring at the top of the load and/or SLCS. SLCS may then be stowed in a suitable location. When stowed, the SLCS may be electrically coupled to a charger or another power source.

FIG. 16 illustrates a decision and thrust control module 1600 of a suspended load control system ("SLCS") in accordance with one embodiment. Instructions of, or which embody, decision and thrust control module 1600 may be stored in, for example, memory 1425, and may be executed or performed by, for example, processor 1420, as well as by electrical circuits, firmware, and other computer and logical hardware of SLCS with which decision and thrust control module 1600 may interact. In embodiments, computer processors and memory to perform some or all of decision and thrust control module 1600 may be remote from SLCS, such as in an auxiliary computer in, for example, a carrier, a remote interface, or the like.

Decision and thrust control module 1600 may operate in a closed loop to understand its position and motion in near real time, determine a most desired system response, and send desired response(s) to the air propulsion system thruster array and or winches to mitigate swing of the cable or otherwise control a load during operations.

At block 1605, decision and thrust control module 1600 may obtain data from sensors such as, for example, sensors 1405, such as accelerometer, gyroscope, magnetometer, GPS, lidar/radar, range finders, winch sensors 1412, and or machine vision input, including machine vision processing of images of winch control lines taken by cameras of an SLCS.

In block 1610, decision and thrust control module 1600 combines data from the sensors to obtain a data fusion describing position, orientation, motion, and environment of the SLCS apparatus.

Sensor data is fused and filtered by the SLCS through non-linear flavors of a Kalman Filter to yield an accurate representation of the system's state. Closed-loop control methods including fuzzy-tuned proportional, integral, and derivative feedback controllers which may have bidirectional communication with advanced control methods including deep learning neural nets and future propagated Kalman filters, allowing for further real-time system identification.

In block 1615, decision and thrust control module 1600 performs state estimation using non-linear state estimators to project near-term future motion based on the data fusion and on feedback from the decision and control engine to the state estimator. State estimation and near-term future motion may include a rate of or rate of change of rotation, a mass, a center of mass, a moment of inertia, or the like; one or more of such data or a change in such data may be consistent with incorrect tension of one or more winch control line.

In block 1617, decision and thrust control module 1600 receives a functional mode selection, such as according to user input.

In block 1620, decision and thrust control module 1600 takes the state estimation 1615, informed by the user-selected functional mode or command state 1617, as well as additional feedback from the thrust and orientation and winch mapping 1625 and output control 1640, and determines a desired direction of motion, rotation, center of mass, or response rate of the SLCS.

Algorithmic output is sent to motion or power controllers, such as ESCs, which will send the desired thrust response to the EDF and to the winch(es) as winch control via, for example, phase control of pulse modulated power signals. The net thrust output and winch control is mapped in real-time through encoders and load cells then sent back to decision and control block 1620 and onward for closed-loop control.

In block 1630, decision and thrust control module 1600 maps desired orientation with thrust vectors from EDF to generate a thrust and orientation mapping and maps desired orientation with winch tension to generate a winch tension mapping to achieve the determined thrust, winch tension, and orientation of the SLCS apparatus.

In block 1635, decision and thrust control module 1600 maps the thrust and orientation mapping to fans and fan thrust vectors and to winch tension vectors and generates a fan and winch mapping to control EDFs and winches to achieve the desired thrust and orientation of the SLCS.

In block 1640, decision and thrust control module 1600 applies the fan and winch mapping to output power control signals to move or exert force as decided and to determine activation of fan(s) and or winch(es) to achieve the determined thrust and orientation of the SLCS.

In block 1640, the SLCS thrusters exert the commanded control output, implementing a dynamic response in the form of thrust and winch control, which thrust and winch control may counteract unwanted motion and or may drive the SLCS and load in a desired manner.

If an interrupt condition occurs, such as if an incorrect winch tension error condition is detected or otherwise, decision and thrust control module 1600 may conclude or return to a module which may have called it.

Decision and thrust control module 1600 may be unmanned and automated aside from the high-level operator-selected functional control modes and or user input through a functional control mode. Net output is a control force to move, stabilize, or control a suspended load.

The entire process is unmanned and automated aside from the high-level operator-selected functional control modes and or user input. The net output is a control force to stabilize or control a suspended load.

Figure 17A:
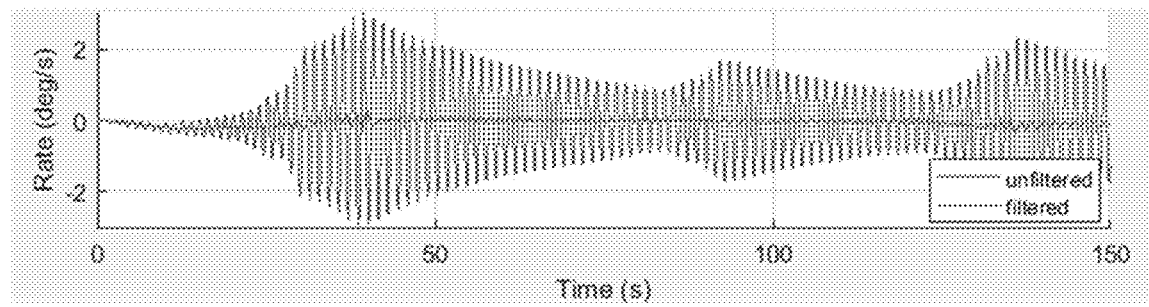
FIG. 17A illustrates a graph of response of a suspended load to controlled by a suspended load control system, with inadequate tension on control lines.
Figure 17B:
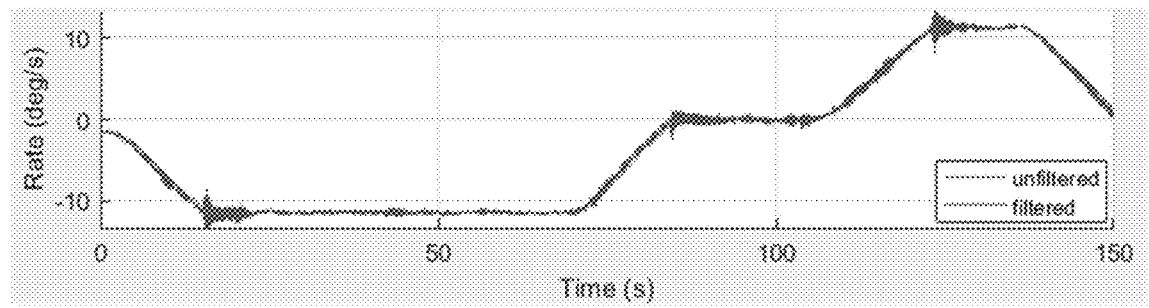
FIG. 17B illustrates a graph of response of a suspended load to controlled by a suspended load control system, with adequate tension on control lines.

FIG. 17A illustrates a graph of response of a suspended load to controlled by an SLCS, with inadequate tension on control lines. FIG. 17B illustrates a graph of response of a suspended load to controlled by the SLCS, with adequate tension on control lines, as may be produced when a system includes apparatuses, systems, and methods as disclosed herein. The graph with inadequate tension in FIG. 17A illustrates that the SLCS is oscillating around its suspended vertical axis (e.g. about the Y axis). The results in reduced ability of the SLCS to control the load, increased latency in application of force (e.g. torque) from the SLCS to the load, increased power use by the SLCS, and significantly reduced performance, which undermines the rationale for employing another piece of equipment, e.g. the SLCS, in an operation. The graph with adequate tension in FIG. 17B illustrates that the SLCS has reduced oscillation around its suspended vertical axis (e.g. about the Y axis), compared to the graph with inadequate tension. The results in increased ability of the SLCS to control the load, decreased latency in application of force (e.g. torque) from the SLCS to the load, lower power use by the SLCS, and performance which provides a rationale for employing the SLCS in the operation. The graph in FIG. 17B further illustrates deliberate rotation the load and response of the SLCS, rather than merely trying to hold the load in one orientation, as in FIG. 17A. The graph in FIG. 17B further has a different scale than in FIG. 17A, though the significantly improved performance of the SLCS can nonetheless be seen in a comparison of these two graphs.

Status indicator lights may be mounted on various surfaces of the SLCS to aid in visibility and operation of the SLCS from above and below. For example, the SLCS may have external lighting such as LEDs near the thrusters that identify the edges and orientation of the SLCS. This allows for improved identification in hard viewing situations such as inclement weather. During operation, both on the remote interface and the system body itself the LED display indicators show that the system is active and convey useful information.

Electronics box 165 may contain and protect computer hardware, such as a computer processor and memory, a power supply, electronic speed controllers, microcontrollers, sensors, and the like. The power supply may be a single power brick or an array of battery cells wired in series and/or in parallel, such as lithium-polymer (LiPo) cells. The batteries may be removable for inspection and/or to swap discharged and charged batteries. Batteries ay be charged while installed in the SLCS (i.e., without having to remove them) via nodes or a wireless charging system on or in an SLCS that connect to a charging dock or power via a wireline connection, such as main power conduit 180. Batteries may include auxiliary battery(ies) to supply a steady supply of power to the processor even if thrusters in fan units draw a relatively large amount of power from main batteries. In embodiments, the crane can provide some power to the SLCS, while the SLCS may obtain other power from an on-board power supply. In various embodiments, the SLCS may be powered by a combination of on-board and remote power. In many environments, all power for the SLCS is contained on board, allowing fully autonomous operation without dependence on the availability of external power sources or delivery means.

Contained within electronics box 165 may be a data link which allows a microcontroller unit or processor to monitor power information including (but not limited to) cell voltage and real-time power dissipation or consumption.

Contained within electronics box 165 may be a thruster controller to allow a computer processor to control the speed, power draw, and thrust of thrusters in the EDF. The thruster controller may be, e.g., an electronic speed controller ("ESC") for an EDF. An ESC typically has at least three connections: to the power supply, to a thruster, and to the processor or a microcontroller, or both. The ESC pulls power from the power supply and allocates it to the thrusters to control the amount of thrust produced by the EDF.

Contained within electronics box 165 may be a computer processor or central processing unit (CPU). The processor may be an embedded system including a signal board computer and one or more microcontroller units ("MCUs"). The CPU and MCUs may be contained within a housing in which data link connections may be made. Electronics box 165 may be made of or comprise a rugged plastic or polymer, protecting the system from environmental and operational factors such as weather and other operational conditions. In some embodiments, the CPU and MCUs are mounted to the same printed circuit board (PCB).

Electronics box 165 may contain one or more wireless transceivers, which may comprise separate transmitter(s) and receiver(s), as well as antennas for wireless communication. The transceiver and/or wireless antennas may also be mounted to or printed on the same printed circuit board as the processor. The wireless transceivers may comprise access points for Bluetooth, Wi-Fi, microwave, and/or radio frequency (RF) transmission and reception. Wireless transceivers may be used to communicate with remote sensors, a remote control unit, a remote positional unit or target node, a remote interface, and the like, as discussed further herein.

Electronics box 165 may contain a vector navigation unit, which may include an inertial measurement unit ("IMU"). The IMU provides inertial navigation data to the processor.

SLCS 105 may comprise or be communicatively coupled to one or more sensors in addition to the IMU. Such additional sensors may comprise, for example, an inertial measurement system, an orientation measurement system, and an absolute position measurement system. The inertial measurement system ("IMS") may include 3 degrees of freedom (3DOF) accelerometers, gyroscopes, and gravitational sensors, which may comprise microelectromechanical systems (MEMS) sensors. The orientation measurement system may include a magnometer or magnetometer such as a compass, an inclinometer, a directional encoder, and a radio frequency relative bearing system. The absolute position measurement system may include global positioning system (GPS) sensors.

Sensors may further comprise a proximity sensor or light detection and ranging (LIDAR) system (e.g., rotating or linear), and/or an optical sensor such as one or more cameras or infrared (IR) sensors. Proximity sensors may include ground height sensors. Optical sensors can also provide visual information to a user. This information may be communicated to remote devices by the SLCS processor, via a data link cable and/or the wireless transceiver. Proximity and optical sensors allow the system to be capable of 360 degree awareness and collision avoidance by detecting obstacles and altering the course of the SLCS to avoid the obstacles. The system is also capable of providing ground (or water) position data to crane operators and ground crew. Sensors which require a view of a surrounding environment may be placed on or at the surface of SLCS 105 and/or remote from SLCS 105.

Additional SLCS sensors may include a strain sensor to gauge load on housings, on fan unit(s), on conduits, on a securement structure to a suspension cable, a control line 110, or the like. Additional sensors may include a rotational encoder or thruster speed sensor which may be incremental or absolute, and a shutdown pin presence sensor.

SLCS may use remote positional sensors or beacons, remote computational units, or target node transceiver devices to assist in characterizing the location and/or motion of the suspending load and/or SLCS 105 (e.g., relative to a crane), the carrier, and a target location of interest such as a load destination.

The SLCS processor applies algorithms to received sensor system data to yield a desired system response. For example, GPS sensor data may be refined through real-time kinetic (RTK) algorithms to develop a refined absolute position. The measurements may be fused together through non-linear data fusion methods, such as Kalman filtration methods, to yield optimal state estimates in all degrees of freedom to characterize the system's location and motion in geodetic space.

The apparatuses and methods in this disclosure are described in the preceding on the basis of several preferred embodiments. Different aspects of different variants are considered to be described in combination with each other such that all combinations that upon reading by a skilled person in the field on the basis of this document may be regarded as being read within the concept of the disclosure. The preferred embodiments do not limit the extent of protection of this document.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

USB (Universal serial bus) may comply or be compatible with Universal Serial Bus Specification, Revision 2.0, published by the Universal Serial Bus organization, Apr. 27, 2000, and/or later versions of this specification, for example, Universal Serial Bus Specification, Revision 3.1, published Jul. 26, 2013. PCIe may comply or be compatible with PCI Express 3.0 Base specification, Revision 3.0, published by Peripheral Component Interconnect Special Interest Group (PCI-SIG), November 2010, and/or later and/or related versions of this specification.

As used in any embodiment herein, the term "logic" may refer to the logic of the instructions of an app, software, and/or firmware, and/or the logic embodied into a programmable circuitry by a configuration bit stream, to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hard-wired circuitry, programmable circuitry such as FPGA. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

As used herein, the term "module" (or "logic") may refer to, be part of, or include an Application Specific Integrated Circuit (ASIC), a System on a Chip (SoC), an electronic circuit, a programmed programmable circuit (such as, Field Programmable Gate Array (FPGA)), a processor (shared, dedicated, or group) and/or memory (shared, dedicated, or group) or in another computer hardware component or device that execute one or more software or firmware programs having executable machine instructions (generated from an assembler and/or a compiler) or a combination, a combinational logic circuit, and/or other suitable components with logic that provide the described functionality. Modules may be distinct and independent components integrated by sharing or passing data, or the modules may be subcomponents of a single module, or be split among several modules. The components may be processes running on, or implemented on, a single compute node or distributed among a plurality of compute nodes running in parallel, concurrently, sequentially or a combination, as described more fully in conjunction with the flow diagrams in the figures.

As used herein, a process corresponds to an instance of a program, e.g., an application program, executing on a processor and a thread corresponds to a portion of the process. A processor may include one or more execution core(s). The processor may be configured as one or more socket(s) that may each include one or more execution core(s).

As used herein "releasable", "connect", "connected", "connectable", "disconnect", "disconnected," and "disconnectable" refers to two or more structures which may be connected or disconnected, generally without the use of tools (examples of tools including screwdrivers, pliers, drills, saws, welding machines, torches, irons, and other heat sources) or with the use of tools but in a repeatable manner (such as through the use of nuts and bolts or screws). As used herein, "attach," "attached," or "attachable" refers to two or more structures or components which are attached through the use of tools or chemical or physical bonding, but wherein the structures or components may not generally be released or re-attached in a repeatable manner. As used herein, "secure," "secured," or "securable" refers to two or more structures or components which are connected or attached.

SLCS 105 may be formed of any suitable material such as metal, plastic, composite materials, such as fiber reinforced resin. SLCS 105 may allow access into internal space via a sealed hatch or one or more removable panels, allowing for maintenance and inspection.

Although specific embodiments have been illustrated and described herein, it will be appreciated by those of ordinary skill in the art that alternate and/or equivalent implementations may be substituted for the specific embodiments shown and described without departing from the scope of the present disclosure. For example, although various embodiments are described above in terms of a crane, in other embodiments an SLCS may be employed under a helicopter. This application is intended to cover any adaptations or variations of the embodiments discussed herein.

Following are non-limiting examples.

Example 1. A load control system to influence at least one of a position, orientation, or motion of a load suspended by a main load bearing line from a carrier, comprising: a rotational coupling, a winch, a winch control line to be secured to the load and the winch, a thruster, a sensor suite, and a computer processor and a memory; wherein the memory comprises a control module which, when executed by the computer processor, is to determine a tension on the winch and at least one of a position, orientation, or motion of the load based on a sensor data from the sensor suite and is to control the tension on the winch and the thruster to influence at least one of the position, orientation, or motion of the load, and wherein the rotational coupling is to allow the load control system to rotate about a vertical axis of the main load bearing line without imparting a significant torque on the main load bearing line.

Example 2. The load control system according to Example 1, wherein the load control system is to be secured to a head block by the rotational coupling, wherein the head block is to be secured to the main load bearing line.

Example 3. The load control system according to Example 1, wherein the rotational coupling comprises a bearing set, wherein the bearing set is radially arrayed around a central axis of the main load bearing line.

Example 4. The load control system according to Example 1, wherein the rotational coupling is not to transfer a main lifting force between the carrier and the load and is to transfer a torque from the load control system to the load via the winch control line.

Example 5. The load control system according to Example 1, wherein the winch control line is not to transfer a main lifting force between the carrier and the load and is to transfer a torque from the load control system to the load via the winch control line.

Example 6. The load control system according to Example 1, wherein the main load bearing line comprises a load bearing rotational coupling, wherein the load bearing rotational coupling is to allow the load to rotate about the vertical axis of the main load bearing line without imparting a significant torque on the main load bearing line.

Example 7. The load control system according to Example 1, further comprising at least one of a plurality of thrusters, a plurality of winches, a plurality of winch control lines.

Example 8. The load control system according to Example 1, wherein the thrust control module is to determine at least the position, orientation, or motion by combining the sensor data from the sensor suite through a non-linear filter to determine a current state and wherein the control module is further to use the current state to control the tension on the winch and the thruster to influence at least one of the position, orientation, or motion of the load.

Example 9. The load control system according to Example 8, wherein to use the current state to control the tension on the winch and the thruster to influence at least one of the position, orientation, or motion of the load is to project near-term future motion based on the current state with feedback from at least one of a functional mode or command state of an operational module, a thrust and orientation mapping, or a fan mapping.

Example 10. The load control system according to Example 1, wherein the thruster comprise at least one of a fan or a flywheel.

Example 11. A computer implemented method to influence at least one of a position, orientation, or motion of a load suspended by a main load bearing line from a carrier, comprising: determining a position, orientation, or motion of the load and a tension on a winch based on a sensor data from a sensor suite, wherein the winch is secured to the load with a winch control line, and controlling the winch and a thruster to influence at least one of the position, orientation, or motion of the load, wherein a rotational coupling allows the winch and thruster to rotate about a vertical axis of the main load bearing line without imparting a significant torque on the main load bearing line.

Example 12. The method according to Example 11, further comprising tensioning the winch control line and activating the thruster to influence at least one of the position, orientation, or motion of the load.

Example 13. The method according to Example 11, further comprising transferring a torque from the load control system to the load via the winch control line.

Example 14. The method according to Example 11, further comprising transferring a main lifting force between the load and the carrier, wherein the main lifting force between the load and the carrier bypasses the rotational coupling.

Example 15. The method according to Example 11, wherein a load bearing rotational coupling allows the load to rotate about the vertical axis of the main load bearing line without imparting a significant torque on the main load bearing line.

Example 16. The method according to Example 11, further comprising determining the position, orientation, or motion and the tension on the winch by combining the sensor data from the sensor suite through a non-linear filter to determine a current state, wherein the current state comprises the position, orientation, or motion and the tension on the winch.

Example 17. The method according to Example 16, further comprising projecting near-term future motion based on the current state and controlling the winch and the thruster based on the near-term future motion.

Example 18. The method according to Example 11, wherein projecting near-term future motion based on the current state comprises updating the current state with feedback from at least one of a functional mode or command state of an operational module, a thrust and orientation mapping, a fan mapping, or a winch mapping.

Example 19. An apparatus to influence at least one of a position, orientation, or motion of a load suspended by a main load bearing line from a carrier, comprising: means to determine a position, orientation, or motion of the load and a tension on a winch from a winch control line based on a sensor data from a sensor suite, means to secure the winch to the load with a winch control line, means to control the winch, winch control line, and a thruster to influence at least one of the position, orientation, or motion of the load, means for a rotational coupling, wherein the rotational coupling allows the winch and thruster to rotate about a vertical axis of the main load bearing line without imparting a significant torque on the main load bearing line.

Example 20. The apparatus according to Example 19, further comprising means to tension the winch control line with the winch and means to activate the thruster to influence at least one of the position, orientation, or motion of the load.

Example 21. The apparatus according to Example 19, further comprising means to transfer a torque to the load via the winch control line.

Example 22. The apparatus according to Example 19, further comprising means to transfer a main lifting force between the load and the carrier, wherein the main lifting force between the load and the carrier bypasses the rotational coupling.

Example 23. The apparatus according to Example 19, further comprising means for a load bearing rotational coupling to allow the load to rotate about the vertical axis of the main load bearing line without imparting a significant torque on the main load bearing line.

Example 24. The apparatus according to Example 19, further comprising means to determine the position, orientation, or motion and the tension on the winch by combining the sensor data from the sensor suite through a non-linear filter to determine a current state, wherein the current state comprises the position, orientation, or motion and the tension on the winch.

Example 25. The apparatus according to Example 24, further comprising means to project near-term future motion based on the current state and means to control the winch and the thruster based on the near-term future motion.

Example 26. The apparatus according to Example 19, wherein means to project near-term future motion based on the current state comprises means to update the current state with feedback from at least one of a functional mode or command state of an operational module, a thrust and orientation mapping, a fan mapping, or a winch mapping.

Example 27. The apparatus according to Example 19, wherein the apparatus is to be suspended above the load at a terminus of the main load bearing line.

Example 28. One or more computer-readable media comprising instructions that cause a computer device, in response to execution of the instructions by a processor of the computer device, to: determine a position, orientation, or motion of a load and a tension on a winch from a winch control line based on a sensor data from a sensor suite; control the winch, winch control line, and a thruster to influence at least one of the position, orientation, or motion of the load; wherein the computer device is secured to a main load bearing line below a carrier by a rotational coupling, wherein the rotational coupling allows the computer device, winch, and thruster to rotate about a vertical axis of the main load bearing line without imparting a significant torque on the main load bearing line.

Example 29. The computer-readable media according to Example 28, wherein the instructions further cause the computer device to tension the winch control line with the winch and to activate the thruster to influence at least one of the position, orientation, or motion of the load.

Example 30. The computer-readable media according to Example 28, wherein the instructions further cause the computer device to transfer a torque to the load via the winch control line.

Example 31. The computer-readable media according to Example 28, wherein a main lifting force is transferred between the load and the carrier, wherein the main lifting force between the load and the carrier bypasses the rotational coupling.

Example 32. The computer-readable media according to Example 28, wherein the instructions further cause the computer device to determine the position, orientation, or motion and the tension on the winch by combining the sensor data from the sensor suite through a non-linear filter to determine a current state, wherein the current state comprises the position, orientation, or motion and the tension on the winch.

Example 33. The computer-readable media according to Example 28, wherein the instructions further cause the computer device to project near-term future motion based on the current state and means to control the winch and the thruster based on the near-term future motion.

Example 34. The computer-readable media according to Example 28, wherein the instructions further cause the computer device to project near-term future motion based on the current state comprises means to update the current state with feedback from at least one of a functional mode or command state of an operational module, a thrust and orientation mapping, a fan mapping, or a winch mapping.

What is claimed is:

1. A suspended load control system to control a winch tension on a load suspended by a main load bearing line from a carrier, comprising:
    a winch, a winch control line to be secured to the load and the winch, a thruster, a sensor suite, and a computer processor and a memory;
    wherein the suspended load control system, including at least the winch and the thruster, is to be suspended below the carrier on the main load bearing line;
    wherein the memory comprises a control module which, when executed by the computer processor, is to determine the winch tension on the winch from the winch control line based on a sensor data from the sensor suite and is to control the winch tension from the winch control line to decrease latency between movement or rotation of the load control system and the load and reduce a reaction time between movement or rotation of the load control system and the load, wherein the winch control line spans between the winch and the load, the load is to be secured to the carrier by the main load bearing line, wherein the main load bearing line is to transfer a main lifting force between the carrier and the load, wherein the winch control line is not to transfer the main lifting force between the carrier and the load, wherein the winch tension from the winch control line is to couple movement or orientation of the load and movement or orientation of the load control system; and
    wherein the control module is to control the thruster to move or rotate the load control system and the load.

2. The suspended load control system according to claim 1, wherein the winch tension from the winch control line is to transfer a thrust from the thruster to the load.

3. The suspended load control system according to claim 1, wherein the suspended load control system is to be secured below the carrier with a rotational coupling between the suspended load control system and the main load bearing line, wherein the rotational coupling is to allow the suspended load control system to rotate about a vertical axis of the main load bearing line without imparting a significant torque on the main load bearing line.

4. The suspended load control system according to claim 1, wherein the control module is further to determine at least one of a position, orientation, or motion of the load based on the sensor data from the sensor suite and is further to control the thruster to influence at least one of the position, orientation, or motion of the suspended load control system and the load.

5. The suspended load control system according to claim 4, wherein the thrust control module is to determine at least the position, orientation, or motion and the winch tension by combining the sensor data from the sensor suite through a non-linear filter.

6. The suspended load control system according to claim 5, wherein the non-linear filter comprises a non-linear flavor of a Kalman Filter.

7. The suspended load control system according to claim 4, wherein the thruster comprises at least one of a fan or a flywheel.

8. A computer implemented method to control a winch tension on a load suspended by a main load bearing line from a carrier, comprising:
    with a suspended load control system, wherein the suspended load control system comprises a winch, a winch control line to be secured to the load and the winch, a thruster, and a sensor suite and wherein the suspended load control system is be suspended below the carrier on the main load bearing line,
    obtaining a sensor data from the sensor suite regarding the winch tension;
    determining the winch tension based on the sensor data from the sensor suite, wherein the winch is to secure the load to the suspended load control system with the winch control line; and
    controlling the winch tension in order to decrease latency between movement or rotation of the load control system and the load and reduce a reaction time between movement or rotation of the load control system and the load;
    controlling the thruster to move or rotate the load control system and the load;
    wherein the winch control line spans between the winch and the load, the load is to be secured to the carrier by the main load bearing line wherein the main load bearing line is to transfer a main lifting force between the carrier and the load, wherein the winch control line is not to transfer the main lifting force between the carrier and the load, wherein the winch tension from the winch control line is to couple movement or orientation of the load and movement or orientation of the suspended load control system.

9. The method according to claim 8, wherein controlling the winch tension further comprises tensioning the winch control line to improve transfer of at least one of a torque or a horizontal thrust from the suspended load control system to the load.

10. The method according to claim 8, further comprising determining at least one of a position, orientation, or motion of the load based on the sensor data from the sensor suite and further comprising controlling the thruster to influence at least one of the position, orientation, or motion of the load.

11. The method according to claim 8, further comprising determining the position, orientation, or motion of the load by combining the sensor data from the sensor suite through a non-linear filter to determine a current state.

12. The method according to claim 11, wherein the non-linear filter comprises a non-linear flavor of a Kalman Filter.

13. The method according to claim 11, further comprising projecting near-term future motion based on the current state and updating the current state with feedback from at least one of a functional mode or command state of an operational module, a thrust and orientation mapping, a fan mapping, or a winch mapping.

14. An apparatus to control a winch tension on a load suspended by a main load bearing line from a carrier, comprising:
  a suspended load control system, wherein the suspended load control system comprises a winch, a winch control line to be secured to the load and the winch, a thruster, and a sensor suite and wherein the suspended load control system is to be ed below the carrier on the main load bearing line;
  means to obtain a sensor data from the sensor suite regarding the winch tension;
  means to determine the winch tension based on the sensor data from the sensor suite, wherein the winch is to secure the load to the suspended load control system with the winch control line;
  means to control the winch tension in order to decrease latency between movement or rotation of the load control system and the load and reduce a reaction time between movement or rotation of the load control system and the load;
  means to control the thruster to move or rotate the load control system and the load;
  wherein the winch control line spans between the winch and the load, the load is to be secured to the carrier by the main load bearing line wherein the main load bearing line is to transfer a main lifting force between the carrier and the load, wherein the winch control line is not to transfer the main lifting force between the carrier and the load, wherein the winch tension from the winch control line is to couple movement or orientation of the load and movement or orientation of the suspended load control system.

15. The apparatus according to claim 14, wherein means to control the winch tension further comprises means to tension the winch control line to improve transfer of at least one of a torque or a horizontal thrust from the suspended load control system to the load.

16. The apparatus according to claim 14, further comprising means to transfer at least one of a torque or a horizontal thrust to the load from the suspended load control system via the winch control line.

17. The apparatus according to claim 14, further comprising means for a load bearing rotational coupling to allow the load and suspended load control system to rotate about the vertical axis of the main load bearing line without imparting a significant torque on the main load bearing line.

18. The apparatus according to claim 14, further comprising means to determine a position, orientation, or motion of the load by combining the sensor data from the sensor suite through a non-linear filter to determine a current state.

19. The apparatus according to claim 18, further comprising means to project near-term future motion based on the current state.

20. The apparatus according to claim 19, wherein means to project near-term future motion based on the current state comprises means to update the current state with feedback from at least one of a functional mode or command state of an operational module, a thrust and orientation mapping, a fan mapping, or a winch mapping.

* * * * *